US00RE40648E

(19) United States
(12) Reissued Patent
Turner et al.

(10) Patent Number: US RE40,648 E
(45) Date of Reissued Patent: Mar. 10, 2009

(54) SYSTEM AND METHOD FOR DOWNHOLE OPERATION USING PRESSURE ACTIVATED VALVE AND SLIDING SLEEVE

(75) Inventors: DeWayne Turner, Tomball, TX (US); Marvin Bryce Traweek, Houston, TX (US); Dick Ross, Houston, TX (US)

(73) Assignee: BJ Services Company, U.S.A., Houston, TX (US)

(21) Appl. No.: 11/711,591

(22) Filed: Feb. 26, 2007

Related U.S. Patent Documents

Reissue of:
(64) Patent No.: 7,152,678
Issued: Dec. 26, 2006
Appl. No.: 10/788,833
Filed: Feb. 27, 2004

U.S. Applications:
(63) Continuation of application No. 10/004,956, filed on Dec. 5, 2001, now Pat. No. 6,722,440, and a continuation-in-part of application No. 09/378,384, filed on Aug. 20, 1999, now Pat. No. 6,397,949.
(60) Provisional application No. 60/251,293, filed on Dec. 5, 2000, and provisional application No. 60/097,449, filed on Aug. 21, 1998.

(51) Int. Cl.
*E21B 43/04* (2006.01)

(52) U.S. Cl. ..... 166/278; 166/227; 166/373; 166/387

(58) Field of Classification Search ..... 166/278, 166/227, 373, 387
See application file for complete search history.

(56) References Cited

U.S. PATENT DOCUMENTS 2,963,089 A * 12/1960 Sizer ..... 166/72
3,051,243 A * 8/1962 Grimmer et al.
3,627,049 A * 12/1971 Young
3,741,249 A * 6/1973 Leutwyler
3,741,300 A * 6/1973 Wolff et al.

(Continued)

FOREIGN PATENT DOCUMENTS

WO WO 97/36089 A1 * 1/1997

OTHER PUBLICATIONS

Baker Hughes, Models CD 6000 and CU 6000 Sliding Sleeves, Flow Control Systems, undated, pp. 52–55 (4 pgs.), Baker Hughes.*
Weatherford, Completion Isolation Valve, www.weatherford.com, printed Nov. 26, 2002, 3 pages, internet.*
Weatherford, Technical Data Manual, printed Oct. 20, 2001, 39 pages, internet.*
Weatherford, CIV/RM, 2001, 2 pages.*
Weatherford, CIV/RM, Jul. 3, 2000, 10 pages.*
Schlumberger, FIV Technology, SMP5836, Feb. 2003, 8 pages.*
Schlumberger, Downhole Valve reduces formation damage in sand–cnntrol completions, www.slb.com, Nov. 25, 2002, 2 pages.*
Schlumberger, Oilfiled Bulletin:: Focus on Completions, date unknown, 3 pages.*
Baker Hughes, Model "B" Multi–Reverse Circulating Valve, Jun. 1997, 5 of 6 pages.*
Osca, HPR–150 System, Technical Bulletin, 2000, 2 pages.*
Baker Hughes, Model CMP Non–elastomeric Circulating Sliding Sleeve, Flow Control, Aug. 1997, 4 pages.*

*Primary Examiner*—Shane Bomar
(74) *Attorney, Agent, or Firm*—Zarian Midgley & Johnson, PLLC

(57) ABSTRACT

An isolation system for producing oil and gas from one or more formation zones and methods of use are provided comprising one or more pressure activated valve and one or more tool shiftable valve. The tool shiftable valve may be actuated before or after actuation of the pressure activated valve.

46 Claims, 41 Drawing Sheets

U.S. PATENT DOCUMENTS 3,749,119 A * 7/1973 Tausch et al.
3,763,933 A * 10/1973 Mott ..... 166/322
3,771,603 A * 11/1973 Crowe ..... 166/72
3,786,866 A * 1/1974 Tausch et al. ..... 166/322
3,814,181 A * 6/1974 Young ..... 166/324
3,814,183 A * 6/1974 Kishel
3,823,773 A * 7/1974 Nutter
3,845,815 A * 11/1974 Garwood ..... 166/154
3,856,085 A * 12/1974 Holden et al.
3,882,935 A * 5/1975 Calhoun ..... 166/322
3,970,147 A * 7/1976 Jessup et al.
3,993,130 A * 11/1976 Papp
4,040,488 A * 8/1977 Nelson
4,113,012 A * 9/1978 Evans et al.
4,143,712 A * 3/1979 James et al.
4,144,937 A * 3/1979 Jackson et al.
4,189,003 A * 2/1980 James et al.
4,280,561 A * 7/1981 Fredd
4,319,634 A * 3/1982 McMahan et al.
4,383,578 A * 5/1983 Baker
4,388,968 A * 6/1983 Brandell ..... 166/236
4,399,870 A * 8/1983 Baugh et al.
4,403,659 A * 9/1983 Upchurch
4,415,038 A * 11/1983 Schmuck ..... 166/373
4,420,043 A * 12/1983 Brooks ..... 166/319
4,429,747 A * 2/1984 Williamson, Jr. ..... 166/321
4,452,313 A * 6/1984 McMahan
4,498,536 A * 2/1985 Ross et al.
4,560,005 A * 12/1985 Helderle et al. ..... 166/332.2
4,605,062 A * 8/1986 Klumpyan et al.
4,627,492 A * 12/1986 MacLaughlin
4,749,044 A * 6/1988 Skipper et al.
4,903,775 A * 2/1990 Manke
4,915,175 A * 4/1990 Mashaw, Jr.
4,928,772 A * 5/1990 Hopmann ..... 166/385
4,940,093 A * 7/1990 Hilsman, III ..... 166/319
4,967,845 A * 11/1990 Shirk ..... 166/386
5,010,955 A * 4/1991 Springer
5,090,481 A * 2/1992 Pleasants et al.
5,137,088 A * 8/1992 Farley et al. ..... 166/319
5,180,007 A * 1/1993 Manke et al. ..... 166/321
5,180,016 A * 1/1993 Ross et al. ..... 166/387
5,183,115 A * 2/1993 Gano ..... 166/319
5,226,494 A * 7/1993 Rubbo et al. ..... 166/250.17
5,240,071 A * 8/1993 Shaw et al. ..... 166/319
5,257,663 A * 11/1993 Pringle et al.
5,263,683 A * 11/1993 Wong
5,287,930 A * 2/1994 McGill ..... 166/373
5,295,538 A * 3/1994 Restarick
5,373,899 A * 12/1994 Dore et al.
5,377,750 A * 1/1995 Arterbury et al.
5,413,180 A * 5/1995 Ross et al. ..... 166/387
5,456,322 A * 10/1995 Tucker et al.
5,518,073 A * 5/1996 Manke et al.
5,558,162 A * 9/1996 Manke et al.
5,597,042 A * 1/1997 Tubel et al.
5,609,178 A * 3/1997 Hennig et al.
5,609,204 A * 3/1997 Rebardi et al. ..... 166/51
5,676,208 A * 10/1997 Finley ..... 166/278
5,730,223 A * 3/1998 Restarick
5,775,421 A * 7/1998 Duhan et al.
5,810,087 A * 9/1998 Patel
5,826,662 A * 10/1998 Beck et al.
5,865,251 A * 2/1999 Rebardi et al.
5,890,540 A * 4/1999 Pia et al.
5,901,796 A * 5/1999 McDonald
5,909,769 A * 6/1999 Duhan et al.
5,950,733 A * 9/1999 Patel
6,125,930 A * 10/2000 Moyes
6,148,915 A * 11/2000 Mullen et al. ..... 166/278
6,148,919 A * 11/2000 Burris et al. ..... 166/319
6,220,357 B1 * 4/2001 Carmichael et al.
6,220,360 B1 * 4/2001 Connell et al.
6,227,298 B1 * 5/2001 Patel ..... 166/321
6,230,808 B1 * 5/2001 French et al.
6,302,216 B1 * 10/2001 Patel ..... 166/375
6,349,772 B2 * 2/2002 Mullen et al.
6,352,119 B1 * 3/2002 Patel
6,386,289 B1 * 5/2002 Patel ..... 166/325
6,397,949 B1 * 6/2002 Walker et al. ..... 166/374
6,446,729 B1 * 9/2002 Bixenman et al. ..... 166/386
6,516,886 B2 * 2/2003 Patel
6,520,257 B2 * 2/2003 Allamon et al.
6,575,246 B2 * 6/2003 Bixenman et al.
6,634,429 B2 * 10/2003 Henderson et al. ..... 166/332.1
6,659,186 B2 * 12/2003 Patel
6,662,877 B2 * 12/2003 Patel
6,684,950 B2 * 2/2004 Patel ..... 166/250.01
6,722,440 B2 * 4/2004 Turner et al. ..... 166/374
6,763,892 B2 * 7/2004 Kaszuba ..... 166/373
2001/0030049 A1 * 10/2001 Patel ..... 166/386
2002/0074128 A1 * 6/2002 Allamon et al. ..... 166/373
2002/0189814 A1 * 12/2002 Freiheit et al. ..... 166/373
2004/0094304 A1 * 5/2004 Turner et al. ..... 166/313

* cited by examiner

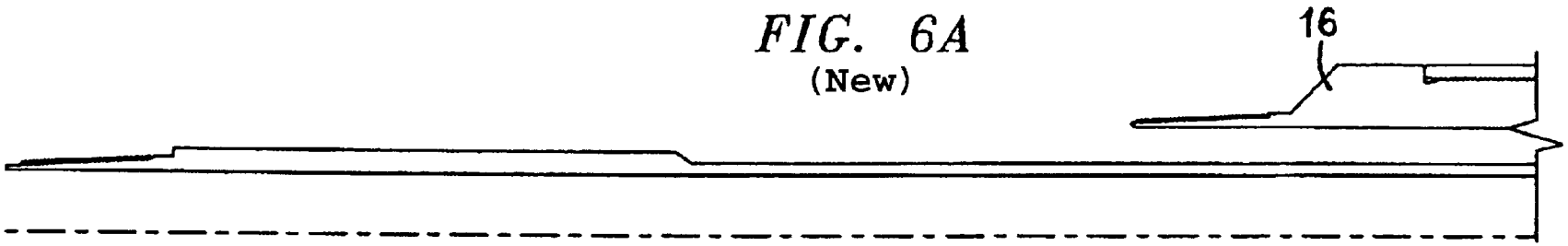
FIG. 6A
(New)
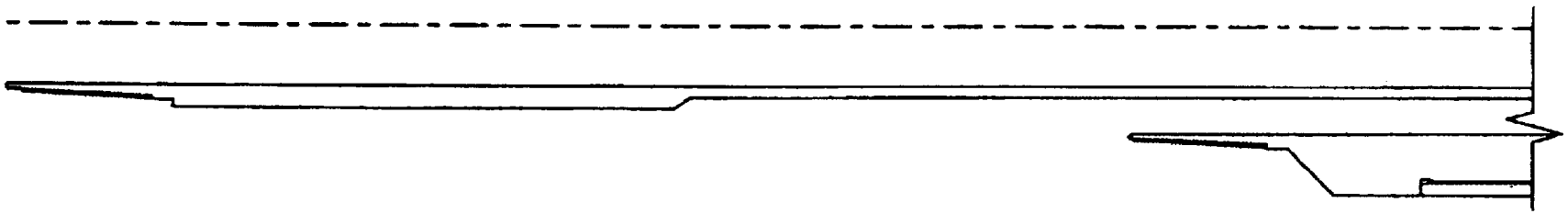
FIG. 5A
(New)

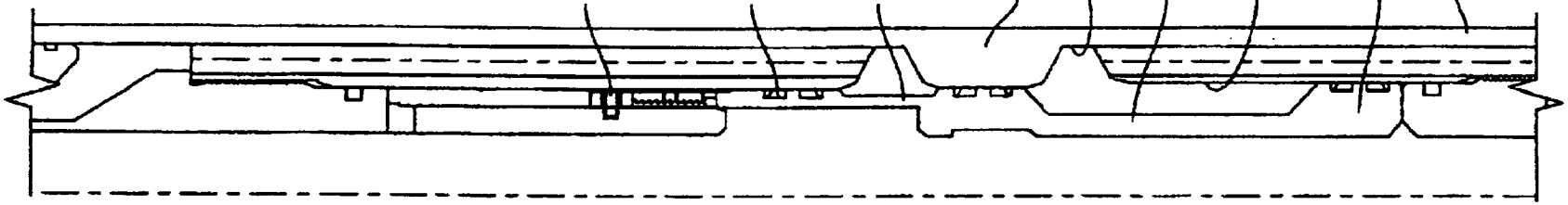
FIG. 6B
(New)
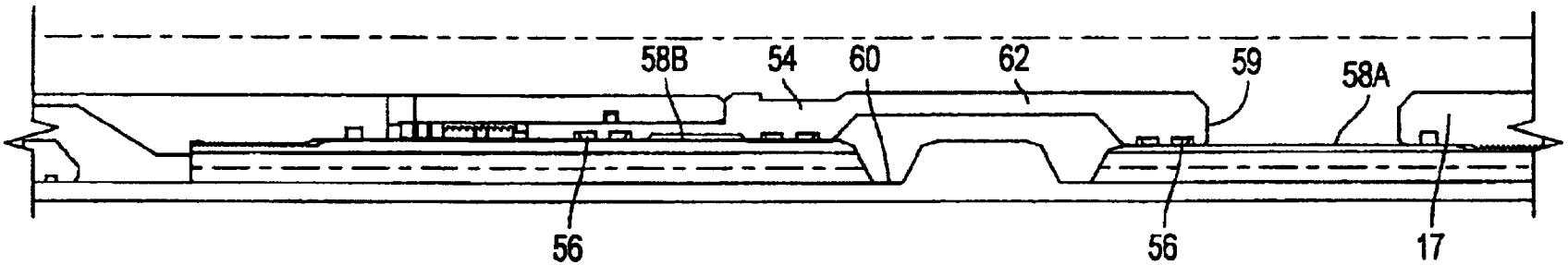
FIG. 5B
(New)

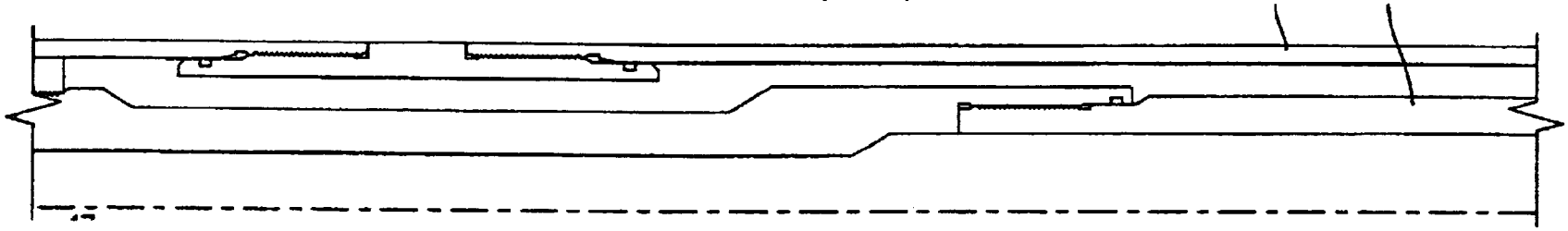
FIG. 6C (New)
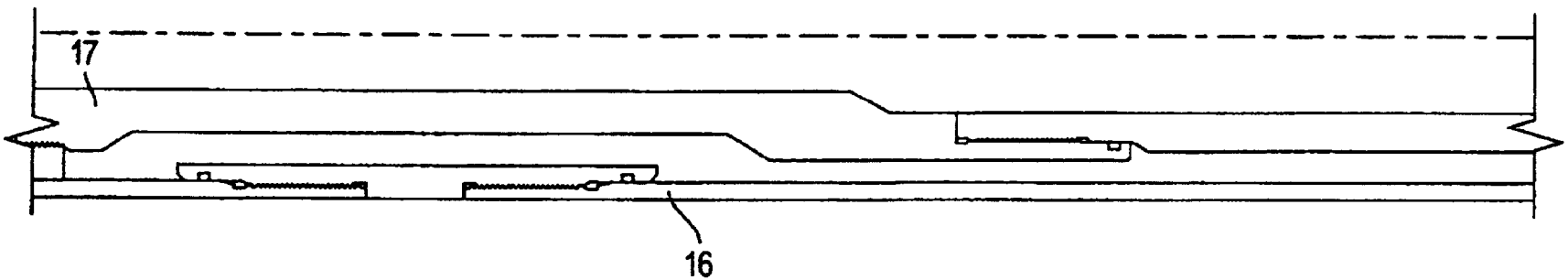
FIG. 5C (New)

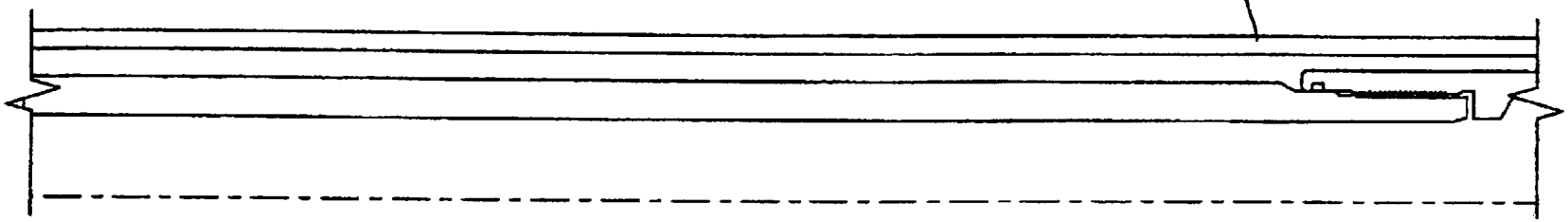
FIG. 6D
(New)
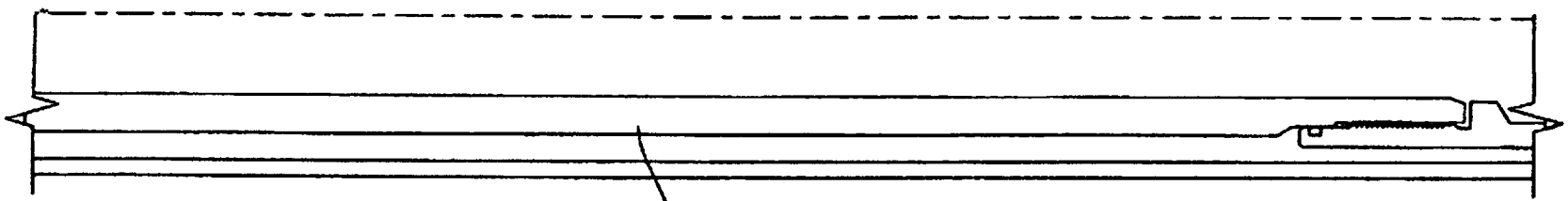
FIG. 5D
(New)

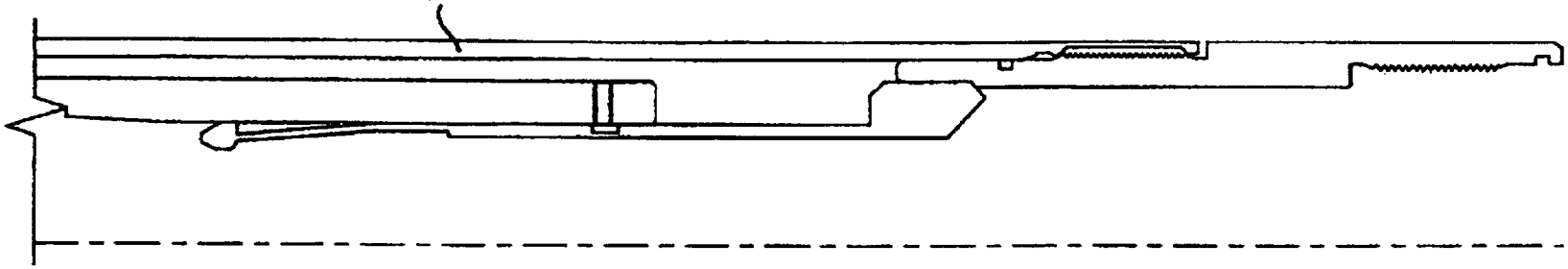
FIG. 6E
(New)
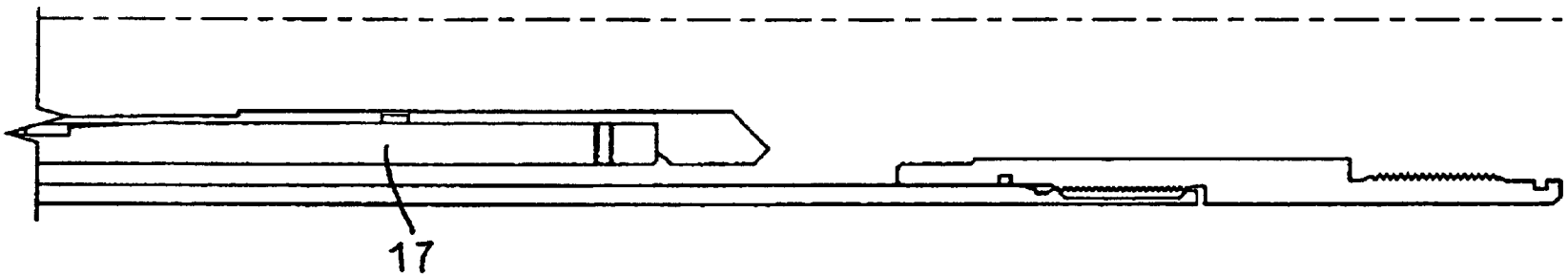
FIG. 5E
(New)

SECTION 'A-A'

SYSTEM AND METHOD FOR DOWNHOLE OPERATION USING PRESSURE ACTIVATED VALVE AND SLIDING SLEEVE

Matter enclosed in heavy brackets [ ] appears in the original patent but forms no part of this reissue specification; matter printed in italics indicates the additions made by reissue.

This application is a continuation of application Ser. No. 10/004,956, filed Dec. 5, 2001, now U.S. Pat. No. 6,722,440, which claims the benefit of U.S. Provisional Application Ser. No. 60/251,293, filed Dec. 5, 2000. U.S. Pat. No. 6,722,440 is also a continuation-in-part of U.S. application Ser. No. 09/378,384, filed on Aug. 20, 1999, now U.S. Pat. No. 6,347,949, which claims the benefit of U.S. Provisional Application Ser. No. 60/097,449, filed on Aug. 21, 1998.

BACKGROUND OF THE INVENTION

The present invention relates to the field of well completion assemblies for use in a wellbore. More particularly, the invention provides a method and apparatus for completing and producing from multiple mineral production zones, independently or in any combination.

The need to drain multiple-zone reservoirs with marginal economics using a single well bore has driven new downhole tool technology. While many reservoirs have excellent production potential, they cannot support the economic burden of an expensive deepwater infrastructure. Operators needed to drill, complete and tieback subsea completions to central production facilities and remotely monitor, produce and manage the drainage of multiple horizons. This requires rig mobilization (with its associated costs running into millions of dollars) to shut off or prepare to produce additional zones from the central production facility.

Another problem with existing technology is its inability to complete two or more zones in a single well while addressing fluid loss control to the upper zone when running the well completion hardware. In the past, expensive and often undependable chemical fluid loss pills were spotted to control fluid losses into the reservoir after perforating and/or sand control treatments. A concern with this method when completing upper zones is the inability to effectively remove these pills, negatively affecting the formation and production potential and reducing production efficiency. Still another problem is economically completing and producing from different production zones at different stages in a process, and in differing combinations. The existing technology dictates an inflexible order of process steps for completion and production.

Prior systems required the use of a service string, wire line, coil tubing, or other implement to control the configuration of isolation valves. Utilization of such systems involves positioning of tools down-hole. Certain disadvantages have been identified with the systems of the prior art. For example, prior conventional isolation systems have had to be installed after the gravel pack, thus requiring greater time and extra trips to install the isolation assemblies. Also, prior systems have involved the use of fluid loss control pills after gravel pack installation, and have required the use of through-tubing perforation or mechanical opening of a wireline sliding sleeve to access alternate or primary producing zones. In addition, the installation of prior systems within the wellbore require more time consuming methods with less flexibility and reliability than a system which is installed at the surface. Each trip into the wellbore adds additional expense to the well owner and increases the possibility that tools may become lost in the wellbore requiring still further operations for their retrieval.

While pressure actuated valves have been used in certain situations, disadvantages have been identified with such devices. For example, prior pressure actuated valves had only a closed position and an open position. Thus, systems could not reliably use more than one such valve, since the pressure differential utilized to shift the first valve from the closed position to the open would be lost once the first valve was opened. Therefore, there could be no assurance all valves in a system would open.

There has therefore remained a need for an isolation system for well control purposes and for wellbore fluid loss control, which combines simplicity, reliability, safety and economy, while also affording flexibility in use.

SUMMARY OF THE INVENTION

The present invention provides a system which allows an operator to, perforate, complete, and produce multiple production zones from a single well in a variety of ways allowing flexibility in the order of operation. An isolation system of the present invention does not require tools to shift the valve and allows the use of multiple pressure actuated valves in a production assembly.

According to one aspect of the invention, after a zone is completed, total mechanical fluid loss is maintained and the pressure-actuated circulating (PAC) and/or pressure-actuated device (PAD) valves are opened with pressure from the surface when ready for production. This eliminates the need to rely on damaging and sometimes non-reliable fluid loss pills being spotted in order to control fluid loss after the frac or gravel pack on an upper zone (during the extended time process of installing completion production hardware).

According to another aspect of the present invention, the economical and reliable exploitation of deepwater production horizons that were previously not feasible are within operational limits of a system of the invention.

A further aspect of the invention provides an isolation sleeve assembly which may be installed inside a production screen and thereafter controlled by generating a pressure differential between the valve interior and exterior.

According to a still another aspect of the invention, there is provided a string for completing a well, the string comprising: a base pipe comprising a hole; at least one packer in mechanical communication with the base pipe; at least one screen in mechanical communication with the base pipe, wherein the at least one screen is proximate the hole in the base pipe; an isolation pipe concentric within the base pipe and proximate to the hole in the base pipe, wherein an annulus is defined between the base pipe and the isolation pipe, and an annulus-to-annulus valve in mechanical communication with the base pipe and the isolation pipe.

Another aspect of the invention provides a system for completing a well, the system comprising: a first string comprising: a first base pipe comprising a hole, at least one first packer in mechanical communication with the first base pipe, at least one first screen in mechanical communication with the first base pipe, wherein the at least one first screen is proximate the hole in the first base pipe, a first isolation pipe concentric within the first base pipe and proximate to the hole in the first base pipe, wherein a first annulus is defined between the first base pipe and the first isolation pipe, and a first annulus-to-annulus valve in mechanical communication with the first base pipe and the first isolation pipe; and a second string which is stingable into the first string, the second string comprising: a second base pipe comprising a hole, at least one second screen in mechanical communication with the second base pipe, wherein the at least one second screen is proximate the hole in the second base pipe, a second isolation pipe concentric within the second base pipe and proximate to the hole in the second base pipe, wherein a second annulus is defined between the second base pipe and the second isolation pipe, and a second annulus-to-annulus valve in mechanical communication with the second base pipe and the second isolation pipe.

According to an aspect of the invention, there is provided a system for completing a well, the system comprising: a first string comprising: a first base pipe comprising a hole, at least one first packer in mechanical communication with the first base pipe, at least one first screen in mechanical communication with the first base pipe, wherein the at least one first screen is proximate the hole in the first base pipe, a first isolation pipe concentric within the first base pipe and proximate to the hole in the first base pipe, wherein a first annulus is defined between the first base pipe and the first isolation pipe, and a first annulus-to-annulus valve in mechanical communication with the first base pipe and the first isolation pipe; and a second string which is stingable into the first string, the second string comprising: a second base pipe comprising a hole, at least one second screen in mechanical communication with the second base pipe, wherein the at least one second screen is proximate the hole in the second base pipe, a second isolation pipe concentric within the second base pipe and proximate to the hole in the second base pipe, wherein a second annulus is defined between the second base pipe and the second isolation pipe, and a second annulus-to-annulus valve in mechanical communication with the second base pipe and the second isolation pipe; and a third string which is stingable into the second string, the third string comprising: a third base pipe comprising a hole, at least one third screen in mechanical communication with the third base pipe, wherein the at least one third screen is proximate the hole in the third base pipe, a third isolation pipe concentric within the third base pipe and proximate to the hole in the third base pipe, wherein a third annulus is defined between the third base pipe and the third isolation pipe, and a third annulus-to-annulus valve in mechanical communication with the third base pipe and the third isolation pipe.

According to a further aspect of the invention, there is provided a method for completing multiple zones, the method comprising: setting a first string in a well proximate a first production zone, wherein the first string comprises: a first base pipe comprising a hole, at least one first packer in mechanical communication with the first base pipe, at least one first screen in mechanical communication with the first base pipe, wherein the at least one first screen is proximate the hole in the first base pipe, a first isolation pipe concentric within the first base pipe and proximate to the hole in the first base pipe, wherein a first annulus is defined between the first base pipe and the first isolation pipe, and a first annulus-to-annulus valve in mechanical communication with the first base pipe and the first isolation pipe: performing at least one completion operation through the first string, isolating the first production zone with the first string; and producing fluids from the first production zone.

According to a further aspect of the invention, there is provided a method for completing multiple zones, the method comprising: setting a first string in a well proximate a first production zone, wherein the first string comprises: a first base pipe comprising a hole, at least one first packer in mechanical communication with the first base pipe, at least one first screen in mechanical communication with the first base pipe, wherein the at least one first screen is proximate the hole in the first base pipe, a first isolation pipe concentric within the first base pipe and proximate to the hole in the first base pipe, wherein a first annulus is defined between the first base pipe and the first isolation pipe, and a first annulus-to-annulus valve in mechanical communication with the first base pipe and the first isolation pipe; performing at least one completion operation through the first string; isolating the first production zone with the first string; and producing fluids from the first production zone; stinging a second string into the first string and setting the second string proximate a second production zone, wherein the second string comprises: a second base pipe comprising a hole, at least one second screen in mechanical communication with the second base pipe, wherein the at least one second screen is proximate the hole in the second base pipe, a second isolation pipe concentric within the second base pipe and proximate to the hole in the second base pipe, wherein a second annulus is defined between the second base pipe and the second isolation pipe, and a second annulus-to-annulus valve in mechanical communication with the second base pipe and the second isolation pipe; performing at least one completion operation through the second string; and producing fluids from the second production zone through the second string.

BRIEF DESCRIPTION OF THE DRAWINGS

The present invention is better understood by reading the following description of non-limitative embodiments with reference to the attached drawings wherein like parts in each of the several figures are identified by the same reference characters, and which are briefly described as follows.

FIGS. 5A through 5B are a cross-sectional side view of a pressure actuated device (PAD) valve shown in an open configuration.

FIGS. 6A through 6E are a cross-sectional side view of the PAD valve of FIG. 5A through 5F, shown in a closed configuration so as to restrict flow through the annulus.

Figure 1A:
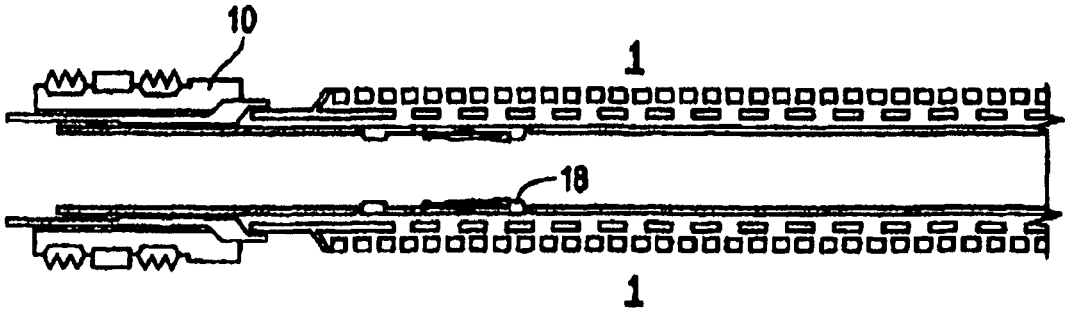
FIGS. 1A through 1I illustrate a cross-sectional, side view of first and second isolation strings.
Figure 2A:
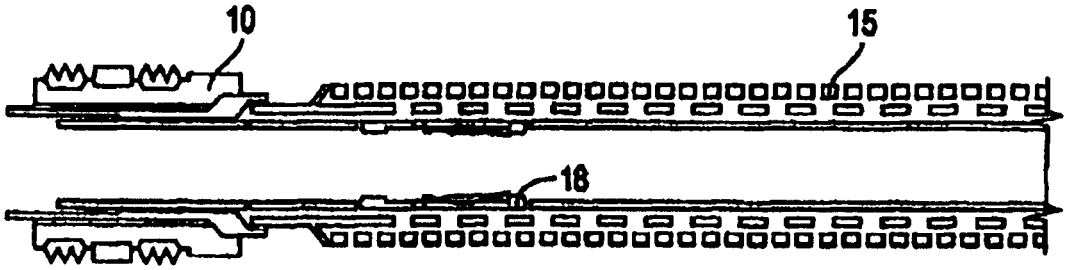
FIGS. 2A through 2L illustrate a cross-sectional, side view of first, second and third isolation strings, wherein the first and second strings co-mingle production fluids.
Figure 3A:
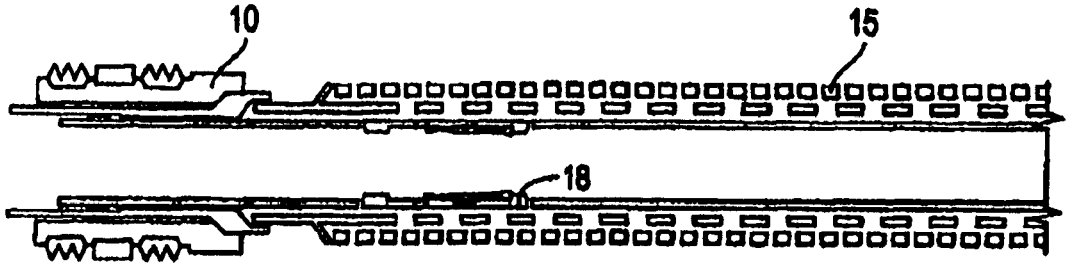
FIGS. 3A through 3K illustrate a cross-sectional, side view of first, second and third isolation strings, wherein the second and third strings co-mingle production fluids.

It is to be noted, however, that the appended drawings illustrate only typical embodiments of this invention and are therefore not to be considered limiting of its scope, as the invention may admit to other equally effective embodiments.

DETAILED DESCRIPTION OF THE INVENTION

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 1A through 1I, there is shown a system for production over two separate zones. A first isolation string 11 is placed adjacent the first production zone 1. A second isolation string 22 extends across the second production zone 2. The first isolation string 11 enables gravel pack, fracture and isolation procedures to be performed on the first production zone 1 before the second isolation string 22 is placed in the well. After the first production zone 1 is isolated, the second isolation string 22 is stung into the first isolation string 11. Without running any tools on wire line or coil tubing to manipulate any of the valves, the second isolation string 22 enables gravel pack, fracture and isolation of the second production zone 2. The first and second isolation strings 11 and 22 operate together to allow simultaneous production of zones 1 and 2 without co-mingling the production fluids. The first production zone 1 produces fluid through the interior of the production pipe or tubing 5 while the second production zone 2 produces fluid through the annulus between the production tubing 5 and the well casing (not shown).

The first isolation string 11 comprises a production screen 15 which is concentric about a base pipe 16. At the lower end of the base pipe 16 there is a lower packer 10 for engaging the first isolation string 11 in the well casing (not shown). Within the base pipe 16, there is a isolation or wash pipe 17 which has an isolation valve 18 therein. A pressure-actuated device (PAD) valve 12 is attached to the tops of both the base pipe 16 and the isolation pipe 17. The PAD valve 12 allows fluid communication through the annuluses above and below the PAD valve. A pressure-actuated circulating (PAC) valve 13 is connected to the top of the PAD valve 12. The PAC valve allows fluid communication between the annulus and the center of the string. Further, an upper packer 19 is attached to the exterior of the PAD valve 12 through a further section of base pipe 16. This section of base pipe 16 has a cross-over valve 21 which is used to communicate fluid between the inside and outside of the base pipe 16 during completion operations.

Once the first isolation string 11 is set in the well casing (not shown) by engaging the upper and lower packers 19 and 10, fracture and gravel pack operations are conducted or may be conducted on the first production zone. To perform a gravel pack operation, a production tube (not shown) is stung into the top of a sub 14 attached to the top of the PAC valve 13. Upon completion of the gravel pack operation, the isolation valve 18 and the PAD valve 12 are closed to isolate the first production zone 1. The tubing is then withdrawn from the sub 14. The second isolation string 22 is then stung into the first isolation string 11. The second isolation string comprises a isolation pipe 27 which stings all the way into the sub 14 of the first isolation string 11. The second isolation string 22 also comprises a base pipe 26 which stings into the upper packer 19 of the first isolation string 11. The second isolation string 22 also comprises a production screen 25 which is concentric about the base pipe 26. A PAD valve 23 is connected to the tops of the base pipe 26 and isolation pipe 27. The isolation pipe 27 also comprises isolation valve 28. Attached to the top of the PAD valve 23 is a sub 30 and an upper packer 29 which is connected through a section of pipe. Production tubing 5 is shown stung into the sub 30. The section of base pipe 26 between the packer 29 and the PAD valve 23 also comprises a cross-over valve 31.

Since the second isolation string 22 stings into the upper packer 19 of the first isolation string 11, it has no need for a lower packer. Further, since the first isolation string 11 has been gravel packed and isolated, the second production zone 2 may be fractured and gravel packed independent of the first production zone 1. As soon as the completion procedures are terminated, the isolation valves 28 and the PAD valve 23 are closed to isolate the second production zone 2.

The production tubing 5 is then stung into the sub 30 for production from either or both of zones 1 or 2. For example, production from zone 1 may be accomplished simply by opening isolation valve 18 and allowing production fluid from zone 1 to flow through the center of the system up through the inside of production tubing 5. Alternatively, production from only zone 2 may be accomplished by opening isolation valve 28 to similarly allow production fluids from zone 2 to flow up through the inside of production tubing 5.

Non-commingled simultaneous production is accomplished by closing isolation valve 18 and opening PAD valve 12 and PAC valve 13 to allow zone 1 production fluids to flow to the inside of the system and up through the center of production tubing 5. At the same time, PAD valve 23 may be opened to allow production fluids from zone 2 to flow through the annulus between production tubing 5 and the casing.

The first isolation string 11 comprises a PAD valve 12 and a PAC valve 13. The second isolation string 22 comprises a PAD valve 23 but does not comprise a PAC valve. PAD valves enable fluid production through the annulus formed on the outside of a production tube. PAC valves enable fluid production through the interior of a production tube. These valves are discussed in greater detail below.

Referring to FIGS. 2A through 2L, an isolation system is shown comprising three separate isolation strings. In this embodiment of the invention, the first production string 11 comprises a lower packer 10 and a base pipe 16 which is connected to the lower packer 10. A production screen 15 is concentric about the base pipe 16. A isolation pipe 17 extends through the interior of the base pipe and has an isolation valve 18 thereon. The PAD valve 12 of the first isolation string is attached to the tops of the base pipe 16 and isolation pipe 17. In this embodiment of the invention, a sub 14 is attached to the top of the PAD valve 12. The first isolation string 11 also comprises an upper packer 19 which is connected to the top of the PAD valve 12 through a length of base pipe 16. The length of base pipe 16 has therein a cross-over valve 21.

The second isolation string 22 is stung into the first isolation string 11 and comprises a base pipe 26 with a production screen 25 therearound. Within the base pipe 26, there is a isolation pipe 27 which is stung into the sub 14 of the first isolation string 11. The isolation pipe 27 comprises isolation valve 28. Further, the base pipe 26 is stung into the packer 19 of the first isolation string 11. The second isolation string 22 comprises a PAD valve 23 which is attached to the tops of the base pipe 26 and isolation pipe 27. A PAC valve 24 is attached to the top of the PAD valve 23. Further, a sub 30 is attached to the top of the PAC valve 24. An upper packer 29 is attached to the top of the PAD valve 23 through a section of base pipe 26 which further comprises a cross-over valve 31.

The third isolation string 32 is stung into the top of the second isolation string 22. The third isolation string 32 comprises a base pipe 36 with a production screen 35 thereon. Within the base pipe 36, there is a isolation pipe 37 which has an isolation valve 38 therein. Attached to the tops of the base pipe 36 and isolation pipe 37, there is a PAD valve 33. A sub 40 is attached to the top of the PAD valve on the interior, and a packer 39 is attached to the exterior of the PAD valve 33 through a section of base pipe 36. A production tubing 5 is stung into the sub 40.

The first isolation string 11 comprises a PAD valve 12 but does not comprise a PAC valve. The second isolation string 22 comprises both a PAD valve 23 and a PAC valve 24. The third isolation string 32 only comprises a PAD valve 33 but does not comprise a PAC valve. This production system enables sequential grave pack, fracture and isolation of zones 1, 2 and 3. Also, this system enables fluid from production zones 1 and 2 to be co-mingled and produced through the interior of the production tubing, while the fluid from the third production zone is produced through the annulus around the exterior of the production tube.

The co-mingling of fluids produced by the first and second production zones is effected as follows: PAD valves 12 and 23 are opened to cause the first and second production zone fluids to flow through the productions screens 15 and 25 and into the annulus between the base pipes 16 and 26 and the isolation pipes 17 and 27. This co-mingled fluid flows up through the opened PAD valves 12 and 23 to the bottom of the PAC valve 24 is also opened to allow this co-mingled fluid of the first and second production zones 1 and 2 to flow from the annulus into the center of the base pipes 16 and 26 and the sub 30. All fluid produced by the first and second production zones through the annulus is forced into the production tube 5 interior through the open PAC valve 24.

Production from the third production zone 3 is effected by opening PAD valve 33. This allows production fluids to flow up through the annulus between the base pipe 36 and the isolation pipe 37, up through the PAD valve 33 and into the annulus between the production tube 5 and the well casing (not shown).

Referring to FIGS. 3A through 3K, a system is shown wherein a first isolation string 11 comprises a PAD valve 12 and a PAC valve 13. This first isolation string 11 is similar to that previously described with reference to FIG. 1. The second isolation string 22 comprises only a PAD valve 23 and is similar to the second isolation string described with reference to FIG. 1. The third isolation string 32 comprises only a PAD valve 33 but no PAC valve and is also similar to the second isolation string described with reference to FIG. 1. This configuration enables production from zone 1 to pass through the PAC valve into the interior of the annulus of the production tubing. The fluids from production zones two and three co-mingle and are produced through the annulus about the exterior of the production tube.

The co-mingling of fluids produced by the second and third production zones is effected as follows: Opening PAD valves 23 and 33 creates an unimpeded section of the annulus. Fluids produced through PAD valves 23 and 33 are co-mingled in the annulus.

Figure 4A:
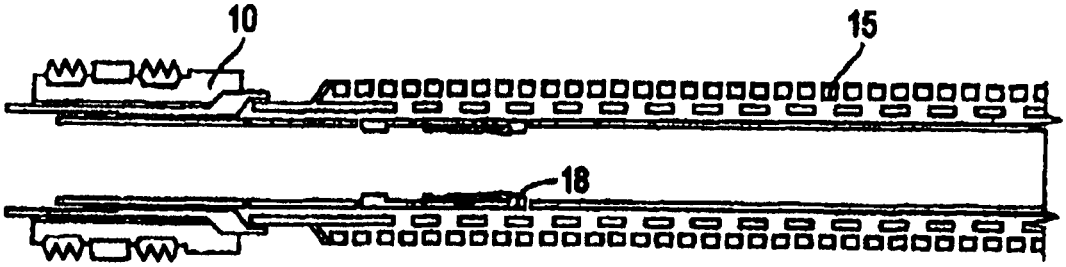
FIGS. 4A through 4N illustrate a cross-sectional, side view of first, second, third and fourth isolation strings, wherein the first and second strings co-mingle production fluids and the third and fourth strings co-mingle production fluids.
Figure 1B:
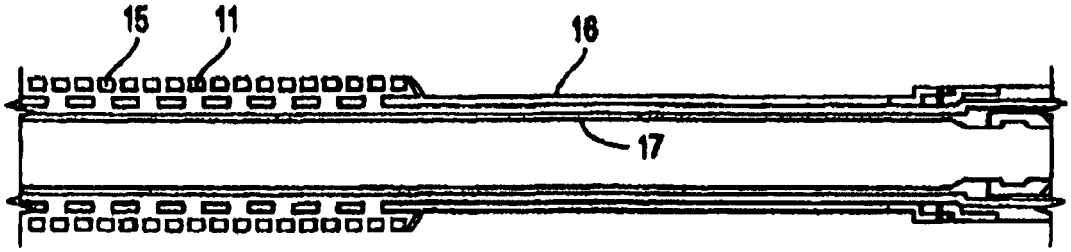
Figure 2B:
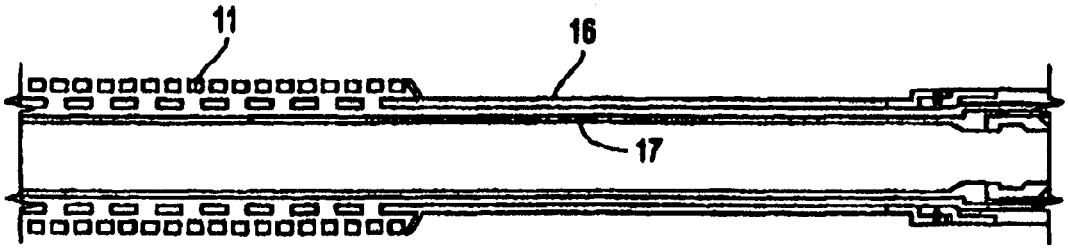
Figure 3B:
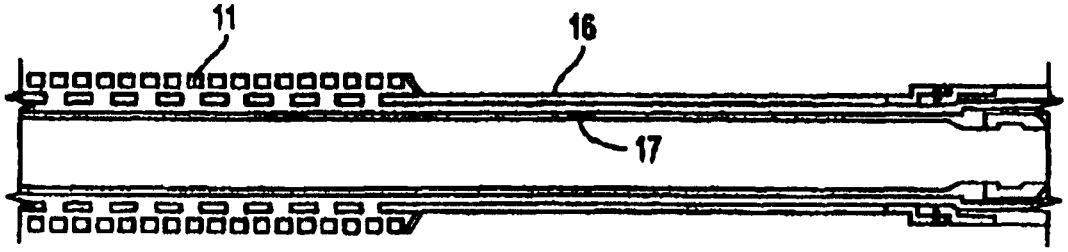
Figure 4B:
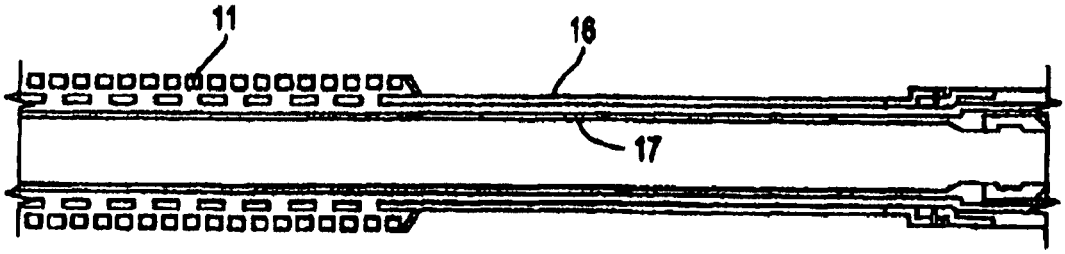
Figure 1C:
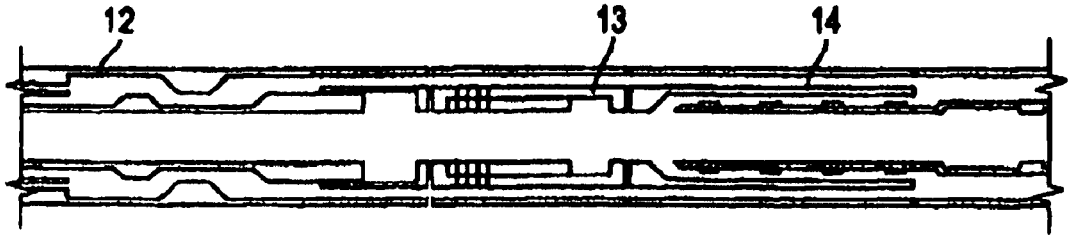
Figure 2C:
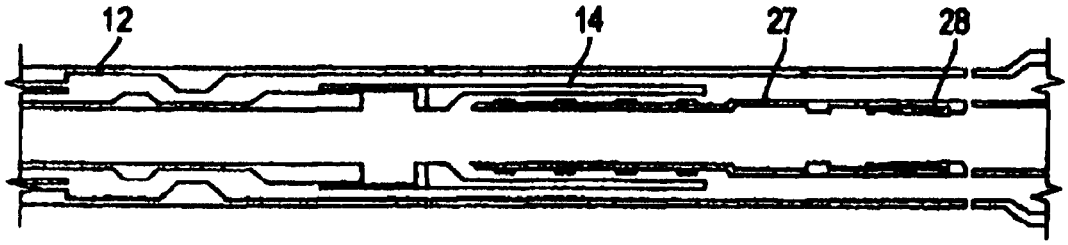
Figure 3C:
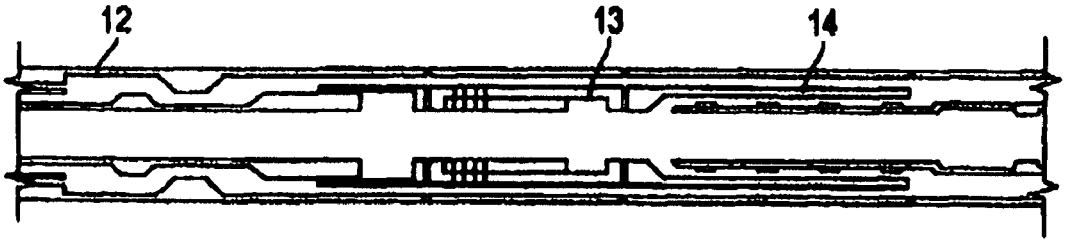
Figure 4C:
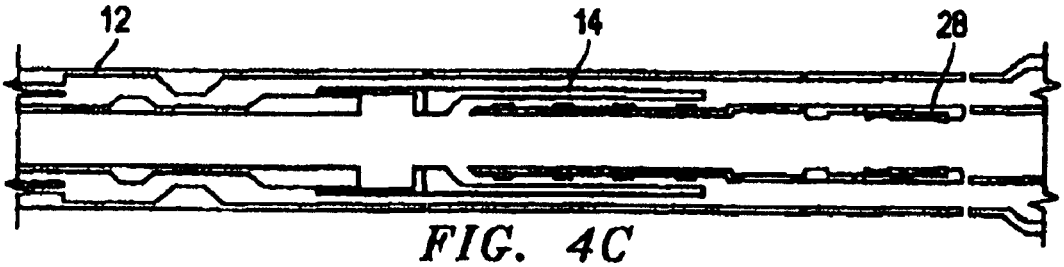
Figure 1D:
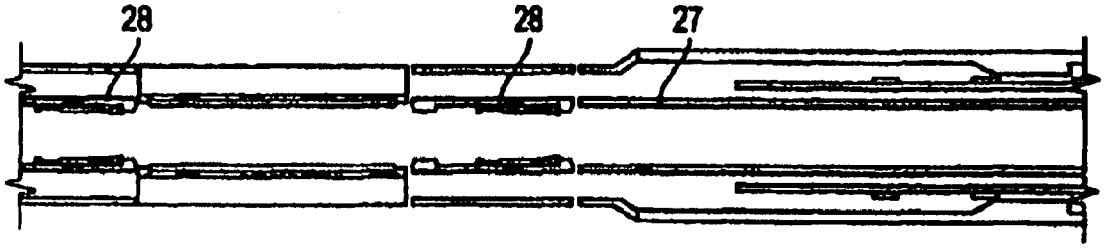
Figure 2D:
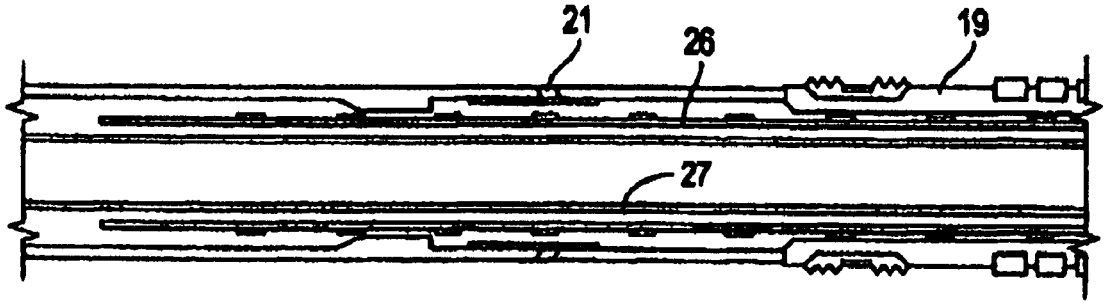
Figure 3D:
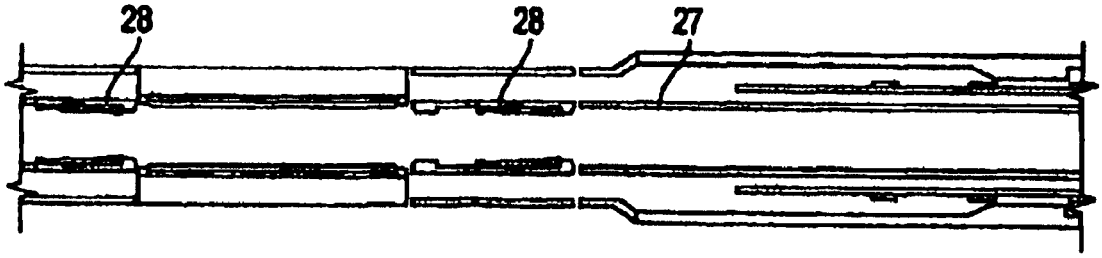
Figure 4D:
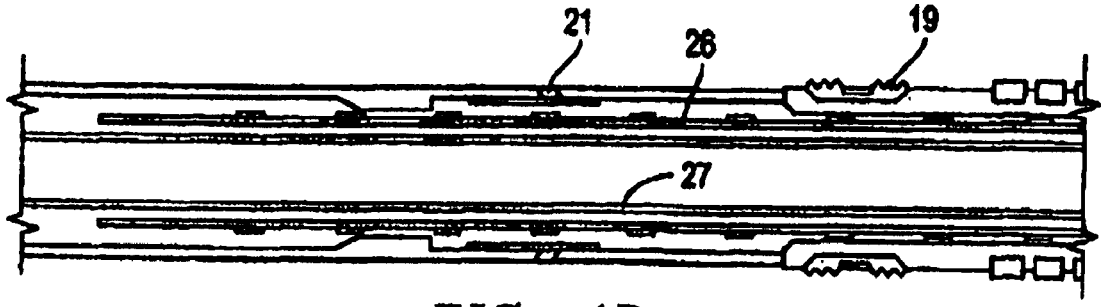
Figure 1E:
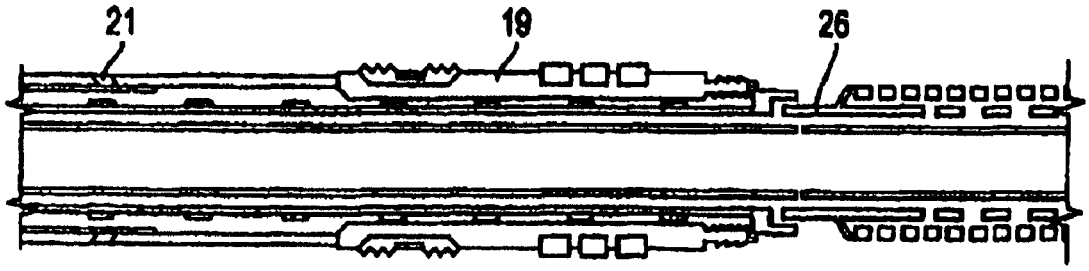
Figure 2E:
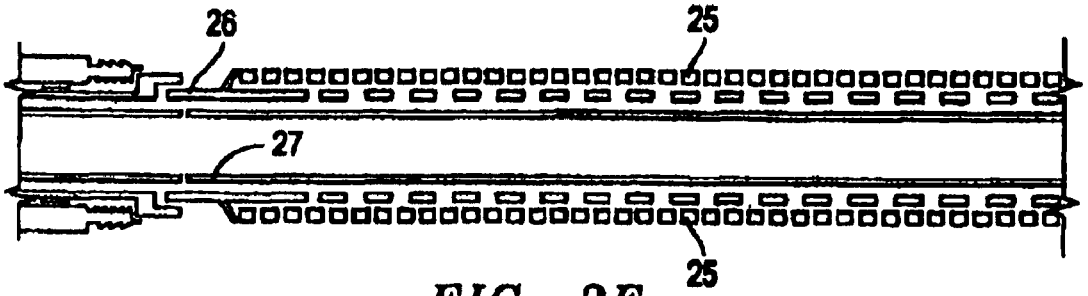
Figure 3E:
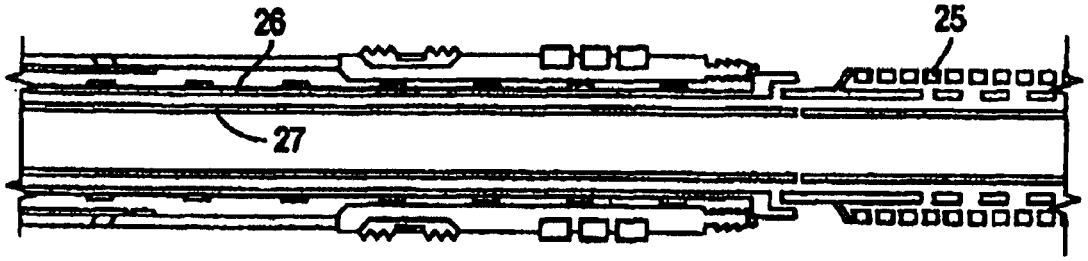
Figure 4E:
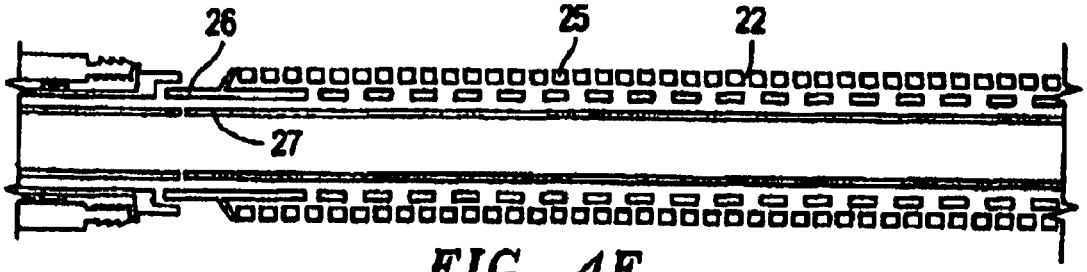
Figure 1F:
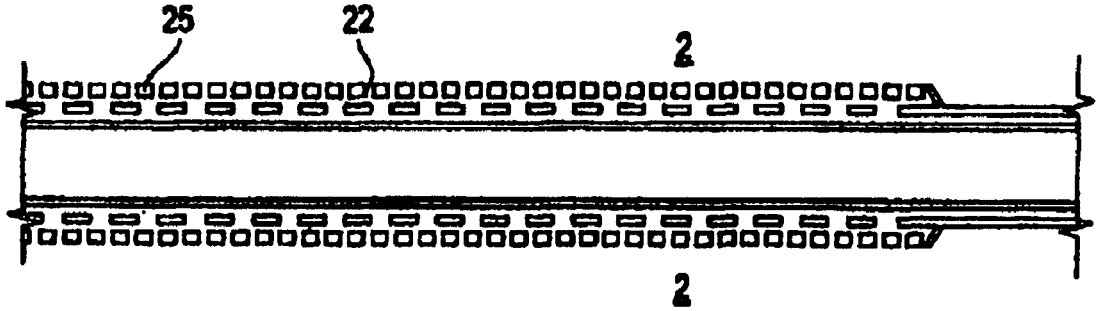
Figure 2F:
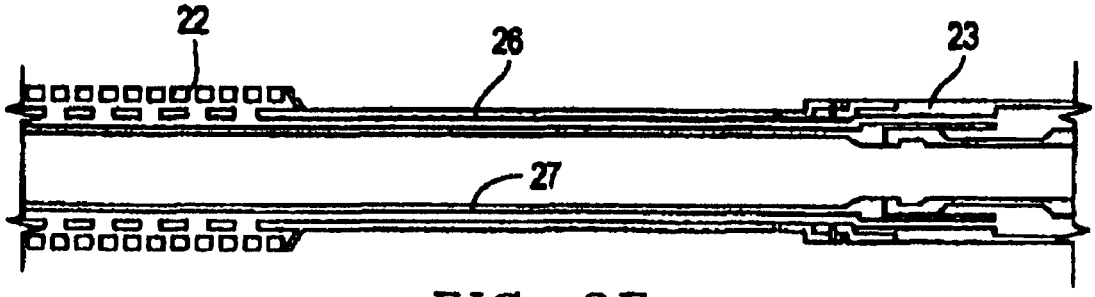
Figure 3F:
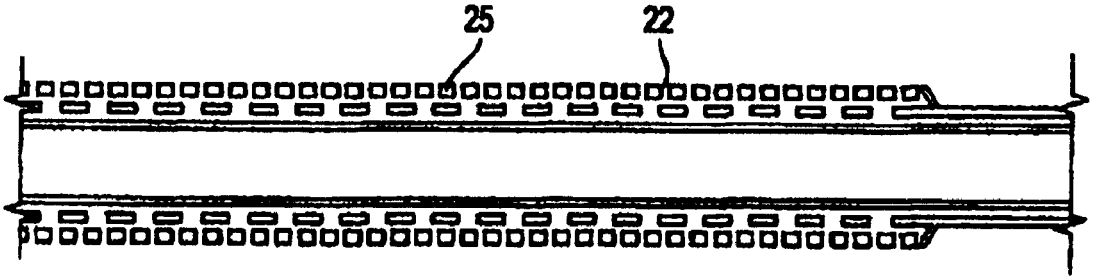
Figure 4F:
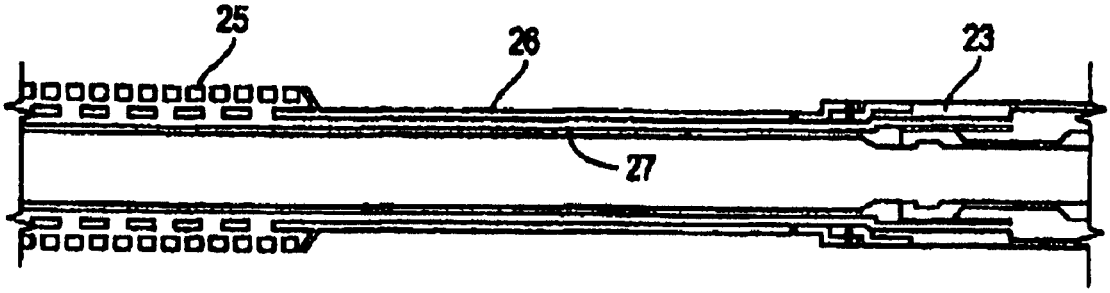
Figure 1G:
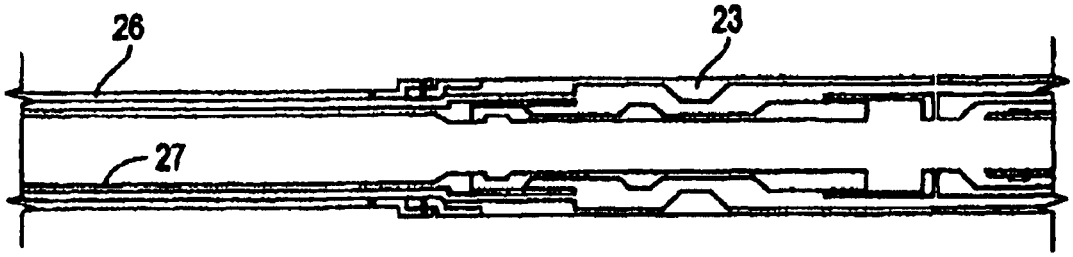
Figure 2G:
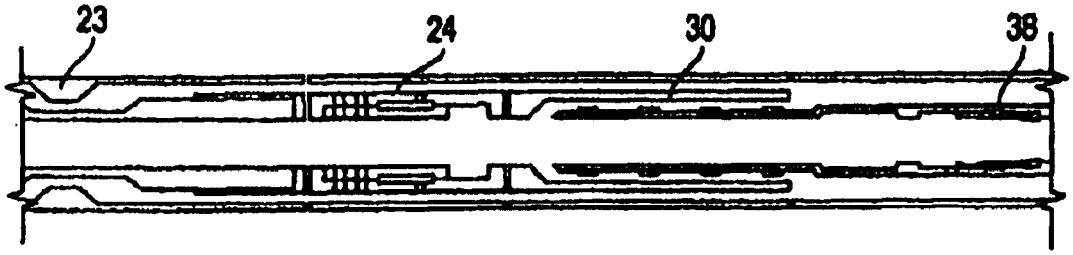
Figure 3G:
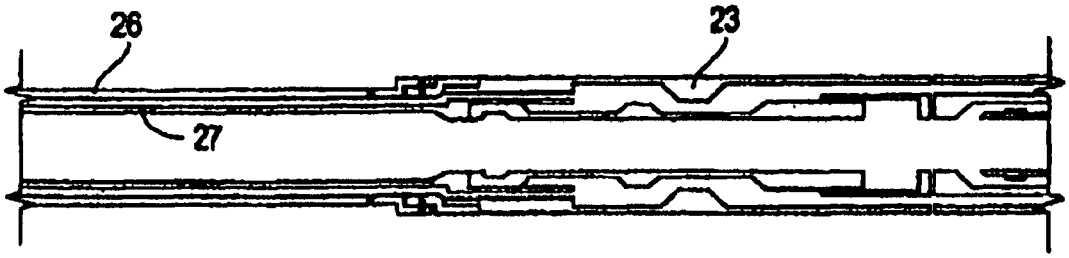
Figure 4G:
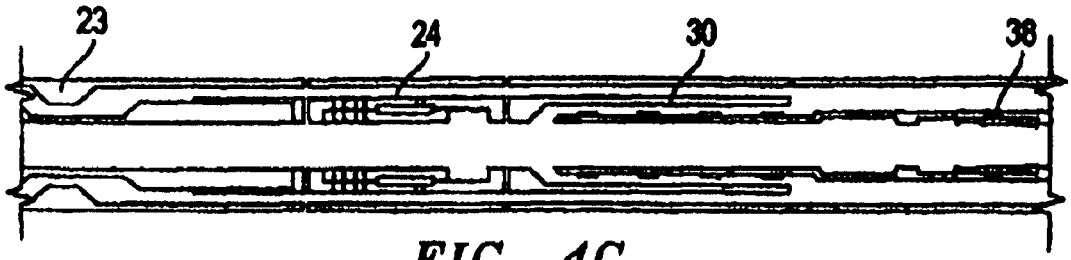
Figure 1H:
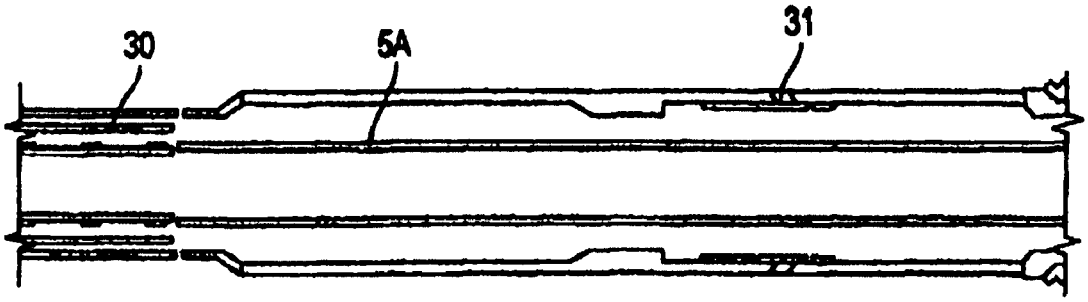
Figure 2H:
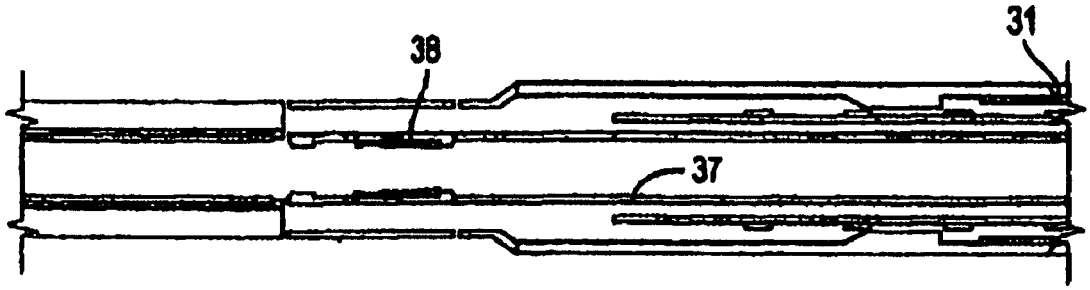
Figure 3H:
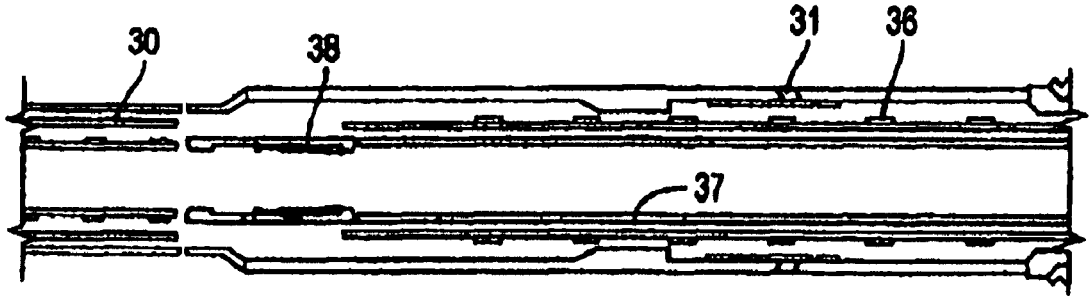
Figure 4H:
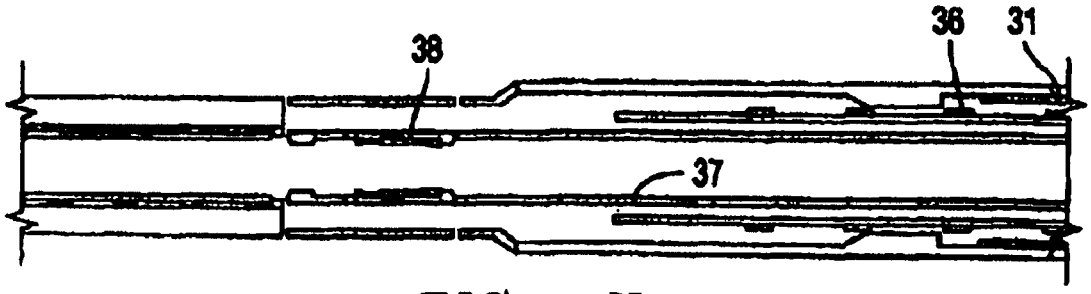
Figure 1I:
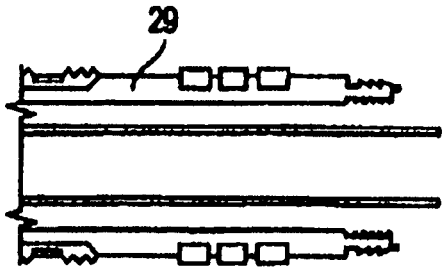
Figure 2I:
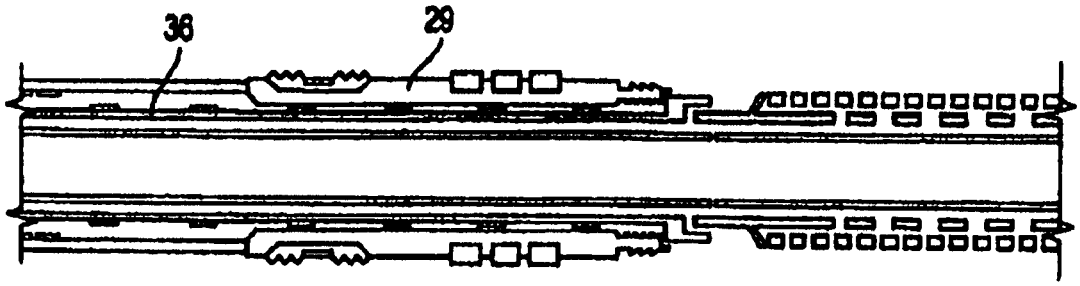
Figure 3I:
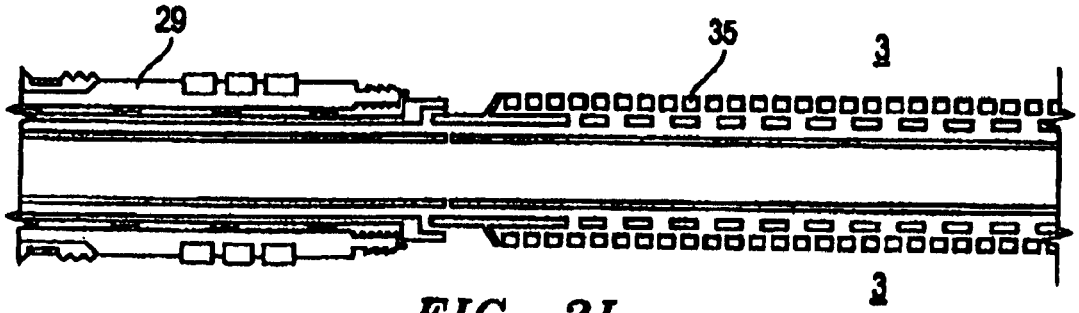
Figure 4I:
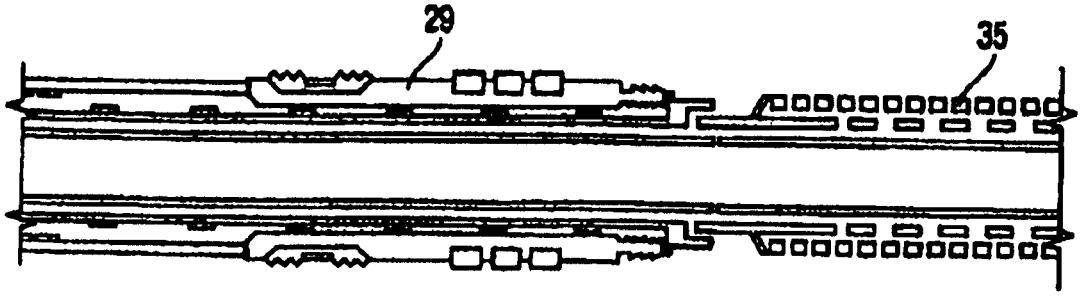
Figure 2J:
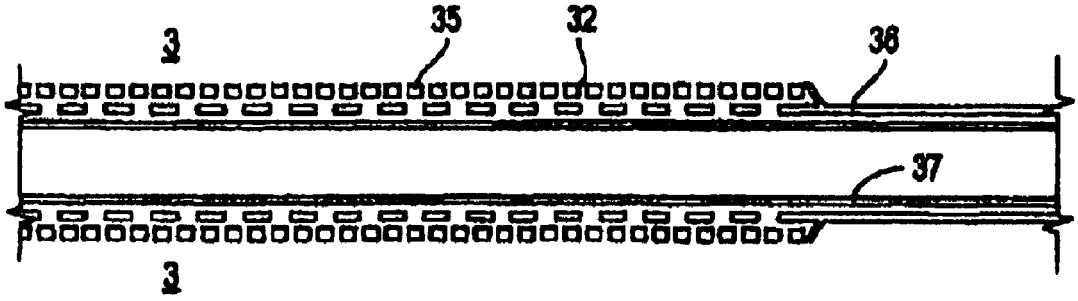
Figure 3J:
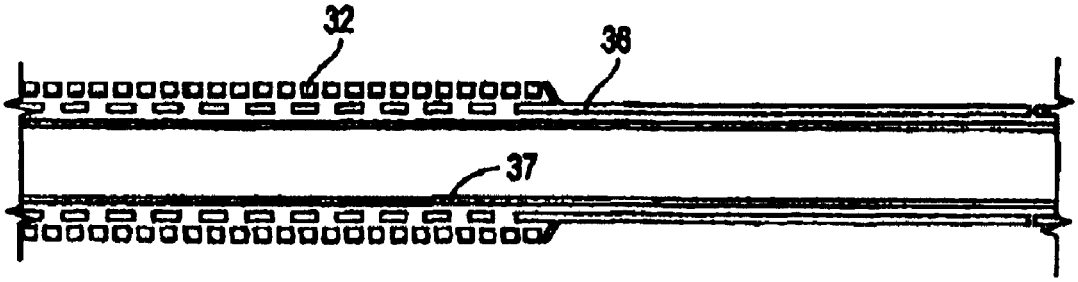
Figure 4J:
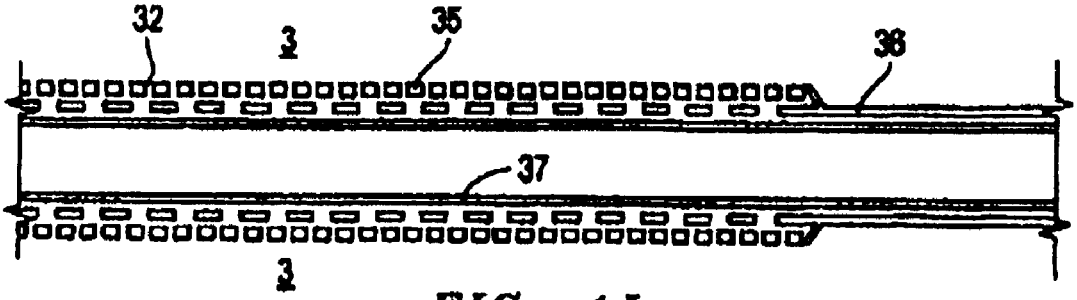
Figure 2K:
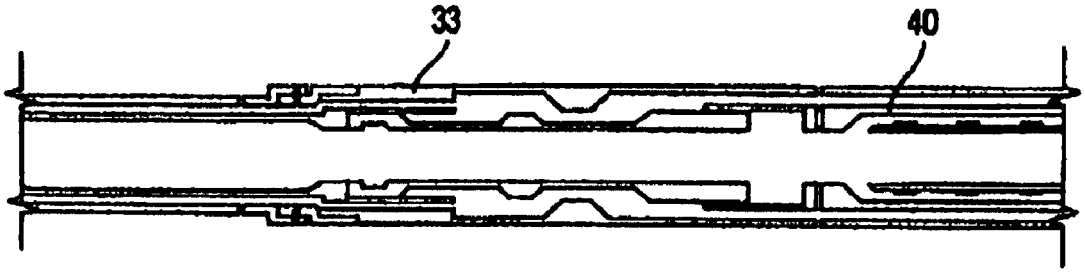
Figure 3K:
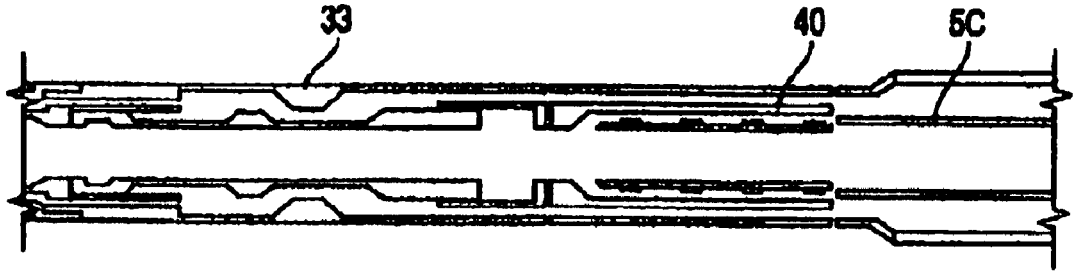
Figure 4K:
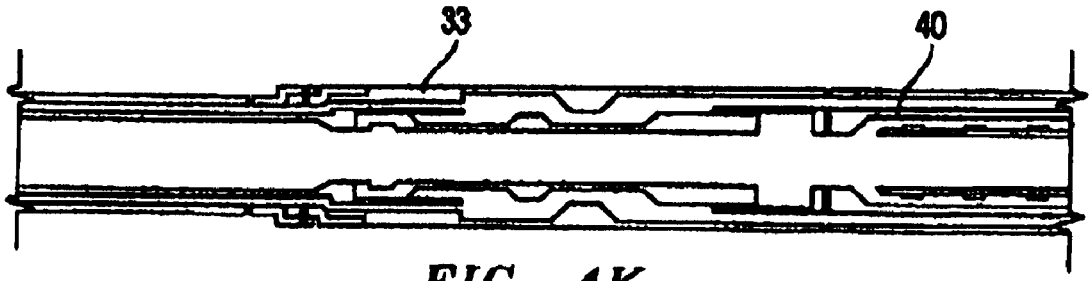
Figure 2L:
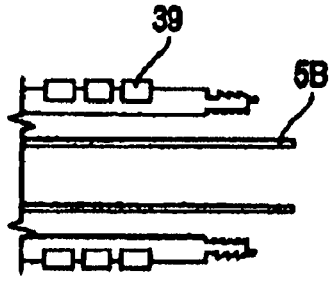
Figure 4L:
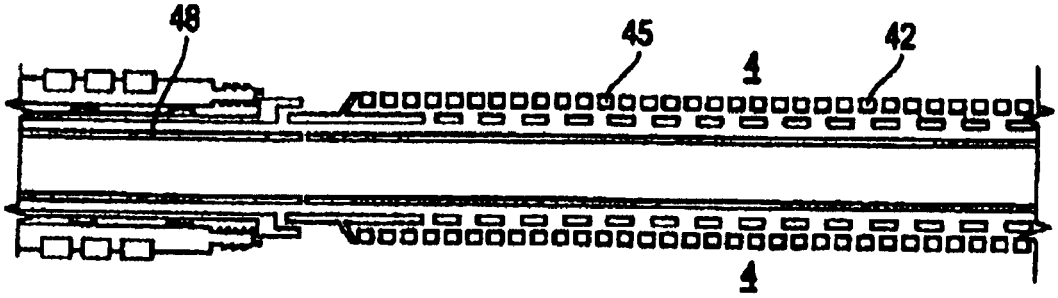
Figure 4M:
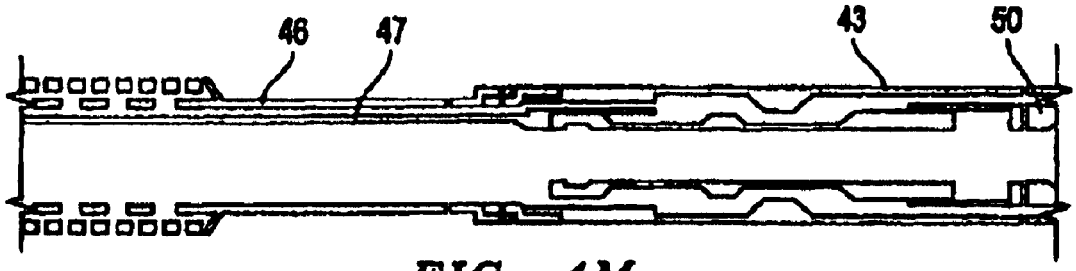
Figure 4N:
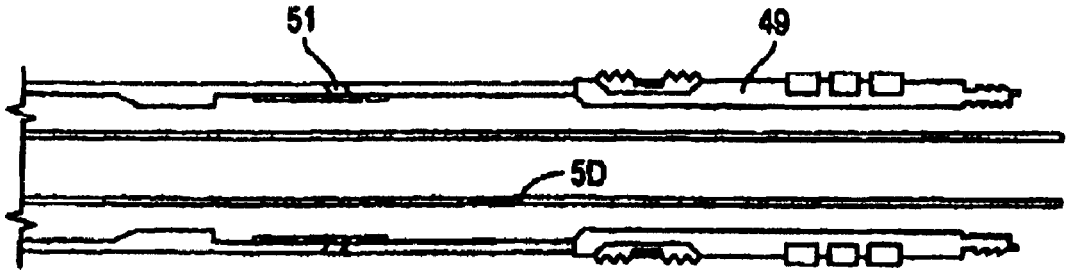
Figure 7A:
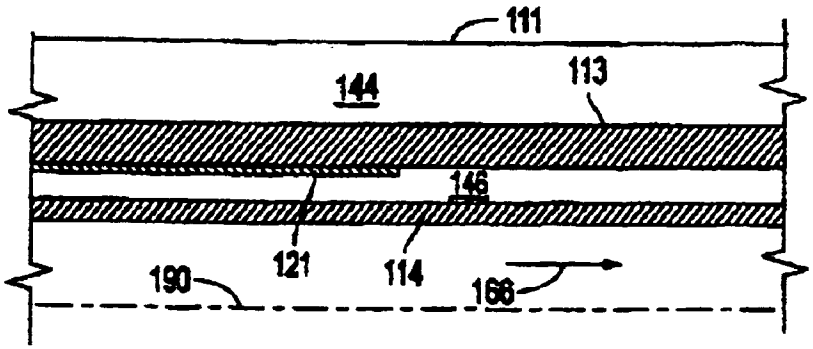
FIGS. 7A through 7D are a side, partial cross-sectional, diagrammatic view of a pressure actuated circulating (PAC) valve assembly in a locked-closed configuration. It will be understood that the cross-sectional view of the other half of the production tubing assembly is a mirror image taken along the longitudinal axis.
Figure 8A:
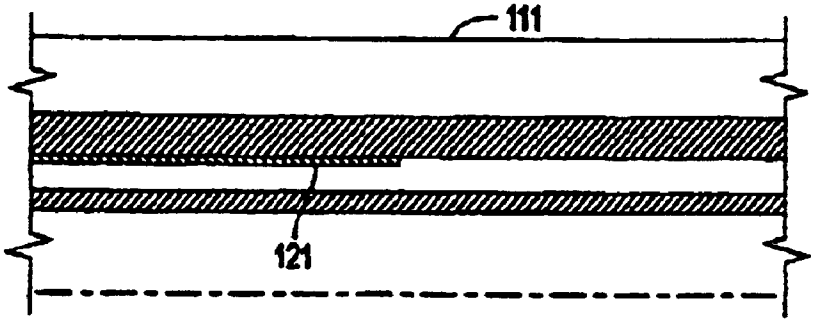
FIGS. 8A through 8D illustrate the isolation system of FIG. 7 in an unlocked-closed configuration.
Figure 7B:
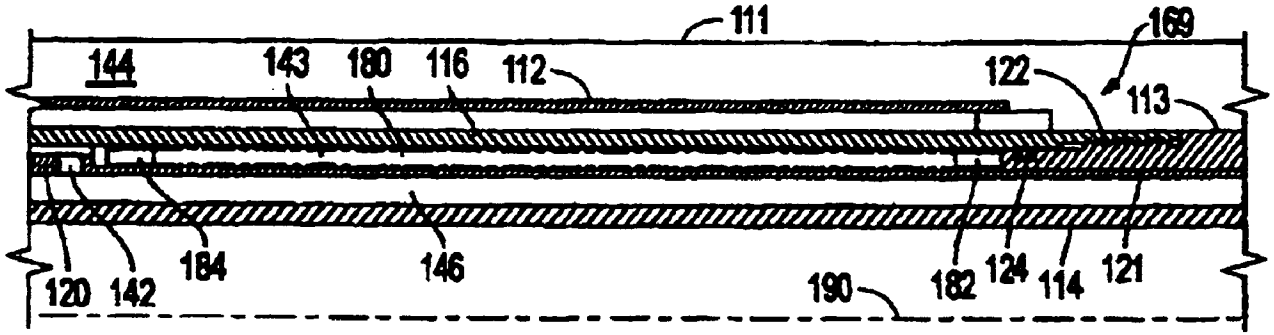
Figure 8B:
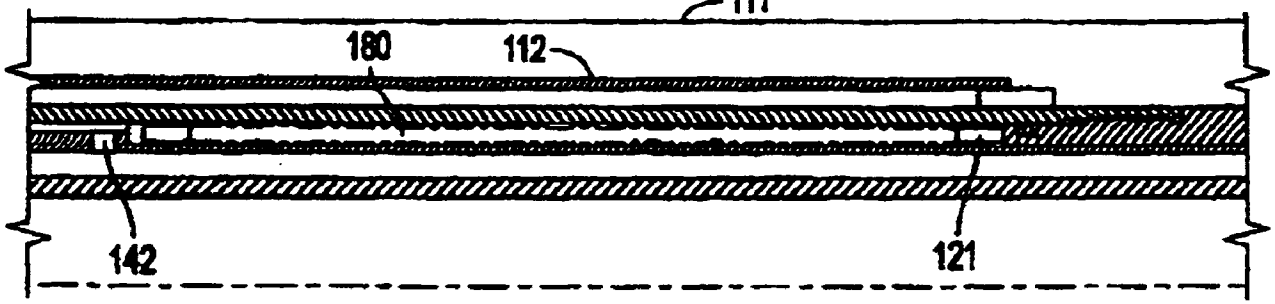
Figure 7C:
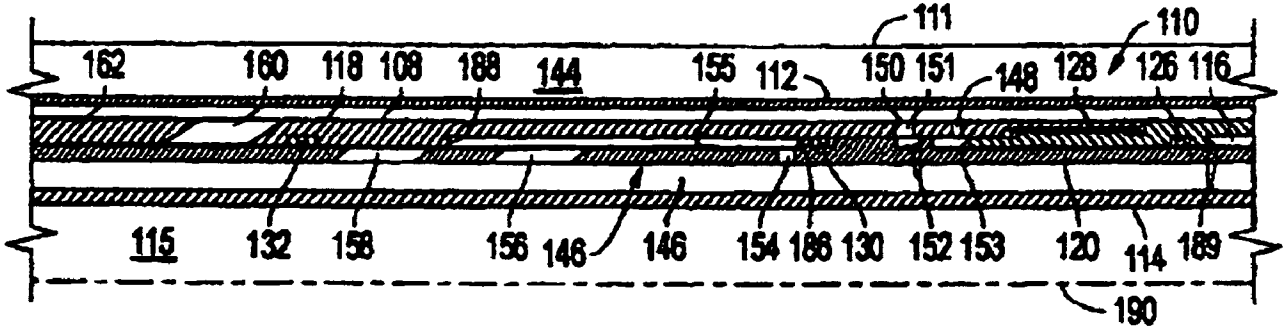
Figure 8C:
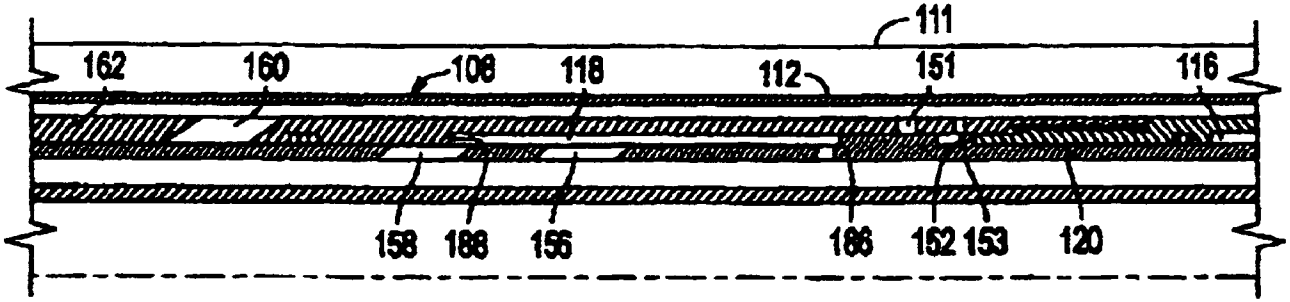

Referring to FIGS. 4A through 4N, a system is shown comprising four isolation strings. The first isolation string 11 comprises a PAD valve 12 but no PAC valve. The second isolation string 22 comprises a PAD valve 23 and a PAC valve 24. The third isolation string 32 comprises a PAD valve 33 but does not comprise a PAC valve. Similarly the fourth isolation string 42 comprises a PAD valve 43 but does not comprise a PAC valve. In this particular configuration, production fluids from zones one and two are co-mingled for production through the PAC valve into the interior of the production tube 5. The fluids from production zones three and four are co-mingled for production through the annulus formed on the outside of the production tube 5.

In this embodiment, the first isolation string 11 is similar to the first isolation string shown in FIG. 2. The second isolation string 22 is also similar to the second isolation string shown in FIG. 2. The third isolation string is also similar to the third isolation string shown in FIG. 2. However, rather than having a production tubing 5 stung into the top of the third isolation string, the embodiment shown in FIG. 4, comprises a fourth isolation string 42. The fourth isolation string comprises a base pipe 46 with a production screen 45 therearound. On the inside of the base pipe 46, there is a isolation pipe 47 which has an isolation valve 48. Attached to the tops of the base pipe 46 and the isolation pipe 47, there is a PAD valve 43. To the interior of the top of the PAD valve 43, there is attached a sub 50. To the exterior of the PAD valve 43, there is attached through a section of base pipe 46, an upper packer 49, wherein the section of base pipe 46 comprises a cross-over valve 51. A production tubing 5 is stung into the sub 50.

Referring to FIGS. 5A through 5E and 6A through 6E, detailed drawings of a PAD valve are shown. In FIG. 5, the valve is shown in an open position and in FIG. 6, the valve is shown in a closed position. In the open position, the valve enables fluid communication through the annulus between the interior and exterior tube of the isolation string. Essentially, these interior and exterior tubes are sections of the base pipe 16 and the isolation pipe 17. The PAD valve comprises a shoulder 52 that juts into the annulus between two sealing lands 58. The shoulder 52 is separated from each of the sealing lands 58 by relatively larger diameter troughs 60. The internal diameters of the shoulder 52 and the sealing lands 58 are about the same. A moveable joint 54 is internally concentric to the shoulder 52 and the sealing land 58. The moveable joint 54 has a spanning section 62 and a closure section 64, wherein the outside diameter of the spanning section 62 is less than the outside diameter of the closure section 64.

The valve is in a closed position, when the valve is inserted in the well. The PAD valve is held in the closed position by a shear pin 55. A certain change in fluid pressure in the annulus will cause the moveable joint 54 to shift, opening the PAD valve by losing the contact between the joint 54 and the shoulder 52. Since the relative diameters of the spanning section 62 and closure section 64 are different, the annulus pressure acts on the moveable joint 54 to slide the moveable joint 54 to a position where the spanning section 62 is immediately adjacent the shoulder 52. Since the outside diameter of the spanning section 62 is less than the inside diameter of the shoulder 52, fluid flows freely around the shoulder 52 and through the PAD valve.

As shown in FIG. 6, in the closed position, the PAD valve restricts flow through the annulus. Here, the PAD valve has contact between the shoulder 52 and the moveable joint 54, forming a seal to block fluid flow through the annulus at the PAD valve.

Referring to FIGS. 7A through 7D, there is shown a production tubing assembly 110 according to the present invention. The production tubing assembly 110 is mated in a conventional manner and will only be briefly described herein. Assembly 110 includes production pipe 140 that extends to the surface and a production screen assembly 112 with PAC valve assembly 108 controlling fluid flow through the screen assembly. In a preferred embodiment production screen assembly 112 is mounted on the exterior of PAC valve assembly 108. PAC valve assembly 108 is interconnected with production tubing 140 at the uphole end by threaded connection 138 and seal 136. Similarly on the downhole end 169. PAC valve assembly 108 is interconnected with production tubing extension 113 by threaded connection 122 and seal 124. In the views shown, the production tubing assembly 110 is disposed in well casing 111 and has inner tubing 114, with an internal bore 115, extending through the inner bore 146 of the assembly.

The production tubing assembly 110 illustrates a single preferred embodiment of the invention. However, it is contemplated that the PAC valve assembly according to the present invention may have uses other than at a production zone and may be mated in combination with a wide variety of elements as understood by a person skilled in the art. Further, while only a single isolation valve assembly is shown, it is contemplated that a plurality of such valves may be placed within the production screen depending on the length of the producing formation and the amount of redundancy desired. Moreover, although an isolation screen is disclosed in the preferred embodiment, it is contemplated that the screen may include any of a variety of external or internal filtering mechanisms including but not limited to screens, sintered filters, and slotted liners. Alternatively, the isolation valve assembly may be placed without any filtering mechanisms.

Referring now more particularly to PAC valve assembly 108, there is shown outer sleeve upper portion 118 joined with an outer sleeve lower portion 116 by threaded connection 128. For the purpose of clarity in the drawings, these openings have been shown at a 45° inclination. Outer sleeve upper portion 118 includes two relatively large production openings 160 and 162 for the flow of fluid from the formation when the valve is in an open configuration. Outer sleeve upper portion 118 also includes through bores 148 and 150. Disposed within bore 150 is shear pin 151, described further below. The outer sleeve assembly has an outer surface and an internal surface. On the internal surface, the outer sleeve upper portion 118 defines a shoulder 188 (FIG. 7C) and an area of reduced wall thickness extending to threaded connection 128 resulting in an increased internal diameter between shoulder 188 and connection 128. Outer sleeve lower portion 116 further defines internal shoulder 189 and an area of reduced internal wall thickness extending between shoulder 189 and threaded connection 122. Adjacent threaded connection 138, outer sleeve portion 118 defines an annular groove 176 adapted to receive a locking ring 168.

Disposed within the outer sleeves is inner sleeve 120. Inner sleeve 120 includes production openings 156 and 158 which are sized and spaced to correspond to production openings 160 and 162, respectively, in the outer sleeve when the valve is in an open configuration. Inner sleeve 120 further includes relief bores 154 and 142. On the outer surface of inner sleeve there is defined a projection defining shoulder 186 and a further projection 152. Further inner sleeve 120 includes a portion 121 having a reduced external wall thickness. Portion 121 extends down hole and slidably engages production pipe extension 113. Adjacent uphole end 167, inner sleeve 120 includes an area of reduced external diameter 174 defining a shoulder 172.

In the assembled condition shown in FIGS. 7A through 7D, inner sleeve 120 is disposed within outer sleeves 116 and 118, and sealed thereto at various locations. Specifically, on either side of production openings 160 and 162, seals 132 and 134 seal the inner and outer sleeves. Similarly, on either side of shear pin 151, seals 126 and 130 seal the inner sleeve and outer sleeve. The outer sleeves and inner sleeve combine to form a first chamber 155 defined by shoulder 188 of outer sleeve 118 and by shoulder 186 of the inner sleeve. A second chamber 143 is defined by outer sleeve 116 and inner sleeve 120. A spring member 180 is disposed within second chamber 143 and engages production tubing 113 at end 182 and inner sleeve 120 at end 184. A lock ring 168 is disposed within recess 176 in outer sleeve 118 and retained in the recess by engagement with the exterior of inner sleeve 120. Lock ring 168 includes a shoulder 170 that extends into the interior of the assembly and engages a corresponding external shoulder 172 on inner sleeve 120 to prevent inner sleeve 120 from being advanced in the direction of arrow 164 beyond lock ring 168 while it is retained in groove 176.

The PAC valve assembly of the present invention has three configurations as shown in FIGS. 7 through 9. In a first configuration shown in FIG. 7, the production openings 156 and 158 in inner sleeve 120 are axially spaced from production openings 160 and 162 along longitudinal axis 190. Thus, PAC valve assembly 108 is closed and restricts flow through screen 112 into the interior of the production tubing. The inner sleeve is locked in the closed configuration by a combination of lock ring 168 which prevents movement of inner sleeve 120 up hole in the direction of arrow 164 to the open configuration. Movement down hole is prevented by shear pin 151 extending through bore 150 in the outer sleeve and engaging an annular recess in the inner sleeve. Therefore, in this position the inner sleeve is in a locked closed configuration.

In a second configuration shown in FIGS. 8A through 8D, shear pin 151 has been severed and inner sleeve 120 has been axially displaced down hole in relation to the outer sleeve in the direction of arrow 166 until external shoulder 152 on the inner sleeve engages end 153 of outer sleeve 116. The production openings of the inner and outer sleeves continue to be axial displaced to prevent fluid flow there through. With the inner sleeve axial displaced down hole, lock ring 168 is disposed adjacent reduced outer diameter portion 174 of inner sleeve 120 such that the lock ring may contract to a reduced diameter configuration. In the reduced diameter configuration shown in FIG. 8, lock ring 168 may pass over recess 176 in the outer sleeve without engagement therewith. Therefore, in this configuration, inner sleeve is in an unlocked position.

In a third configuration shown in FIGS. 9A through 9D, inner sleeve 120 is axially displaced along longitudinal axis 190 in the direction of arrow 164 until production openings 156 and 158 of the inner sleeve are in substantial alignment with production openings 160 and 162, respectively, of the outer sleeve. Axial displacement is stopped by the engagement of external shoulder 186 with internal shoulder 188. In this configuration, PAC valve assembly 108 is in an open position.

In the operation of a preferred embodiment, at least one PAC valve according to the present invention is mated with production screen 112 and, production tubing 113 and 140, to form production assembly 110. The production assembly according to FIG. 7 with the PAC valve in the locked-closed configuration, is then inserted into casing 111 until it is positioned adjacent a production zone (not shown). When access to the production zone is desired, a predetermined pressure differential between the casing annulus 144 and internal annulus 146 is established to shift inner sleeve 120 to the unlocked-closed configuration shown in FIG. 8. It will be understood that the amount of pressure differential required to shift inner sleeve 120 is a function of the force of spring 180, the resistance to movement between the inner and outer sleeves, and the shear point of shear pin 151. Thus, once the spring force and resistance to movement have been overcome, the shear pin determines when the valve will shift. Therefore, the shifting pressure of the valve may be set at the surface by inserting shear pins having different strengths.

A pressure differential between the inside and outside of the valve results in a greater amount of pressure being applied on external shoulder 186 of the inner sleeve than is applied on projection 152 by the pressure on the outside of the valve. Thus, the internal pressure acts against shoulder 186 of to urge inner sleeve 120 in the direction of arrow 166 to sever shear pin 151 and move projection 152 into contact with end 153 of outer sleeve 116. It will be understood that relief bore 148 allows fluid to escape the chamber formed between projection 152 and end 153 as it contracts. In a similar fashion, relief bore 142 allows fluid to escape chamber 143 as it contracts during the shifting operation. After inner sleeve 120 has been shifted downhole, lock ring 168 may contract into the reduced external diameter of inner sleeve positioned adjacent the lock ring. Often, the pressure differential will be maintained for a short period of time at a pressure greater than that expected to cause the down hole shift to ensure that the shift has occurred. This is particularly important where more than one valve according to the present invention is used since once one valve has shifted to an open configuration in a subsequent step, a substantial pressure differential is difficult to establish.

The pressure differential is removed, thereby decreasing the force acting on shoulder 186 tending to move inner sleeve 120 down hole. Once this force is reduced or eliminated, spring 180 urges inner sleeve 120 into the open configuration shown in FIG. 9. Lock ring 168 is in a contracted state and no longer engages recess 176 such the ring now slides along the inner surface of the outer sleeve. In a preferred embodiment spring 180 has approximately 300 pounds of force in the compressed state in FIG. 8. However, varying amounts of force may be required for different valve configurations. Moreover, alternative sources other than a spring may be used to supply the force for opening. As inner sleeve 120 moves to the open configuration, relief bore 154 allows fluid to escape chamber 155 as it is contracted, while relief bores 148 and 142 allow fluid to enter the connected chambers as they expand.

Figure 9A:
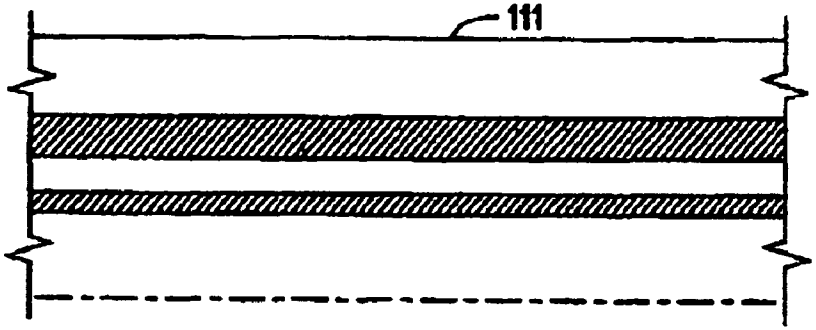
FIGS. 9A through 9D illustrate the isolation system of FIG. 8 in an open configuration.
Figure 9B:
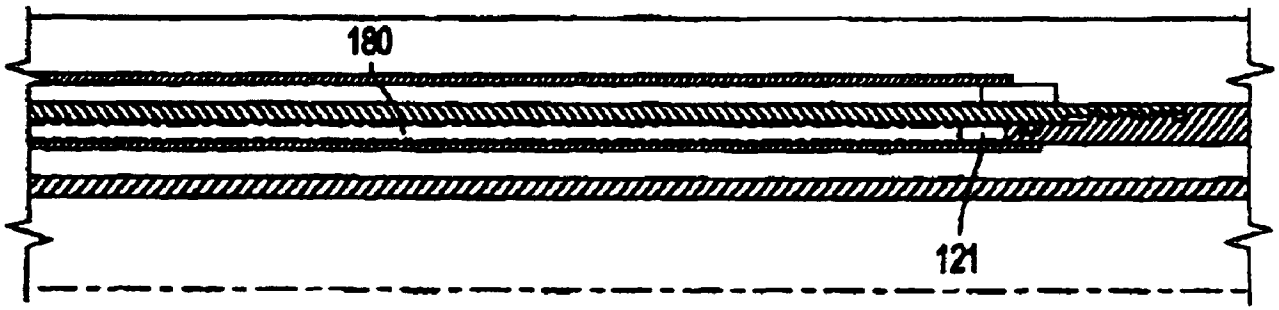
Figure 9C:
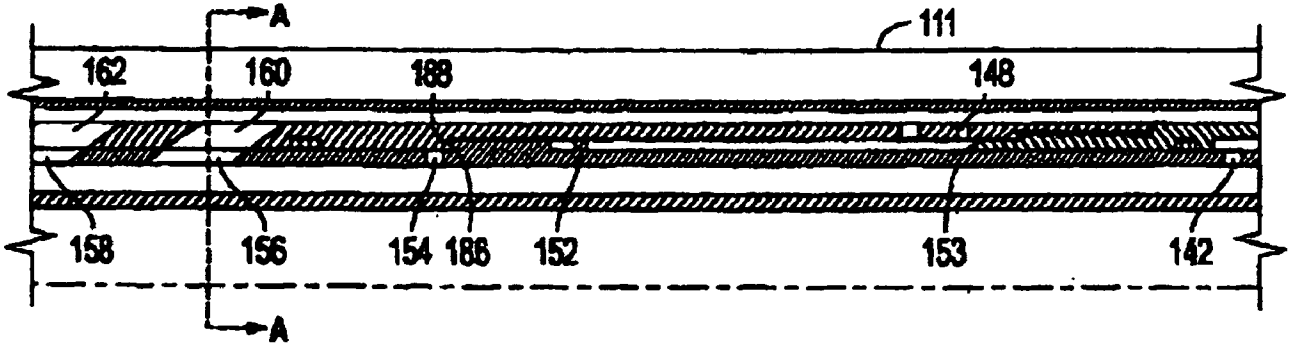
Figure 7D:
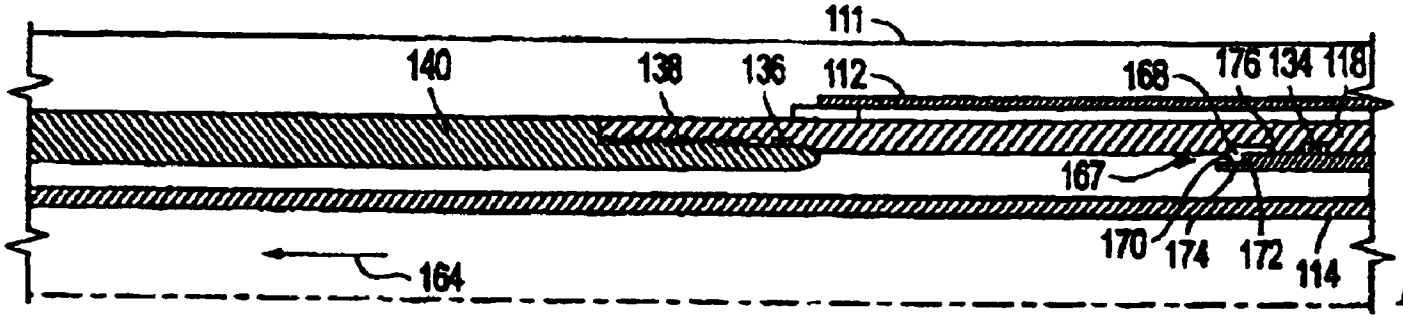
Figure 8D:
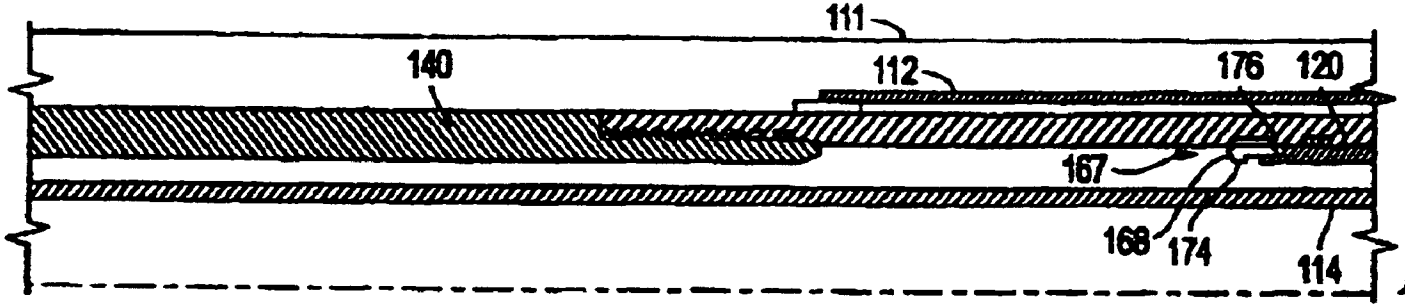
Figure 9D:
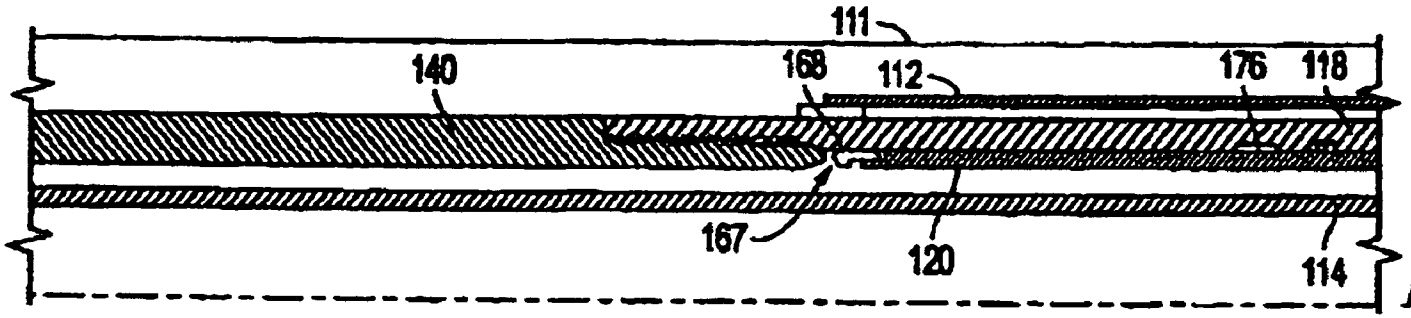
Figure 10:
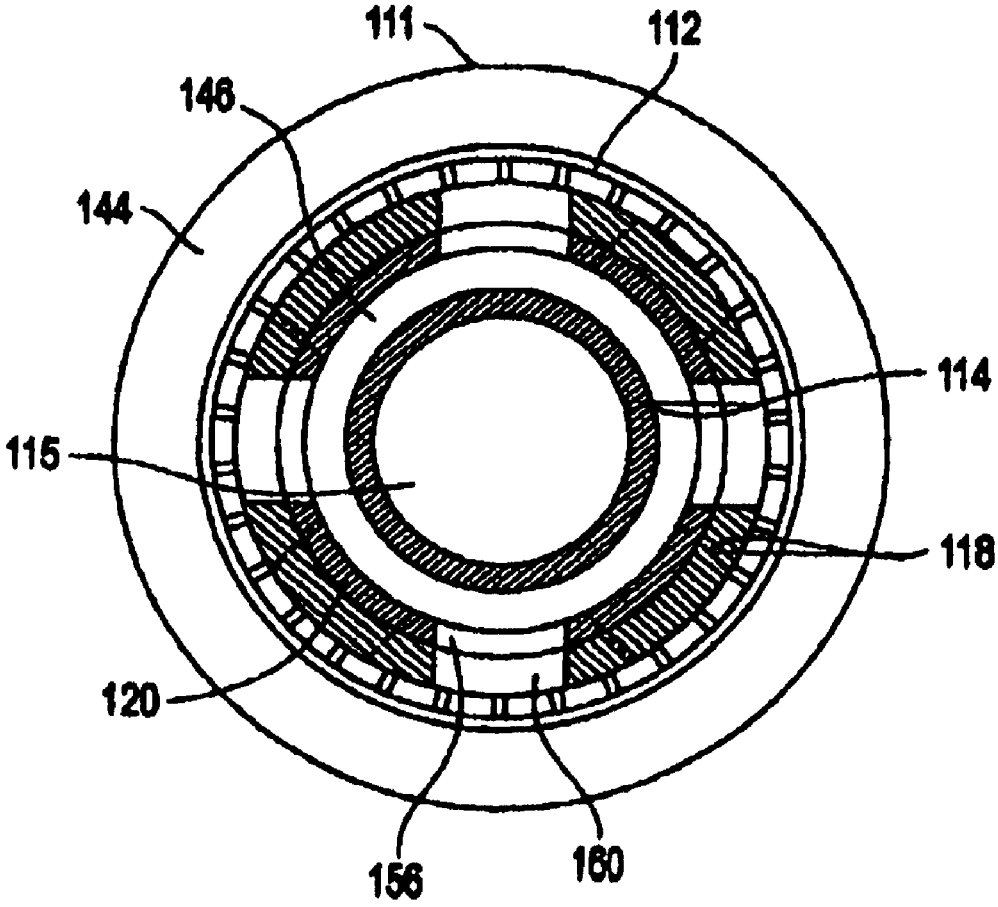
FIG. 10 is a cross-sectional, diagrammatic view taken along line A—A of FIG. 9C showing the full assembly.
Figure 11A:
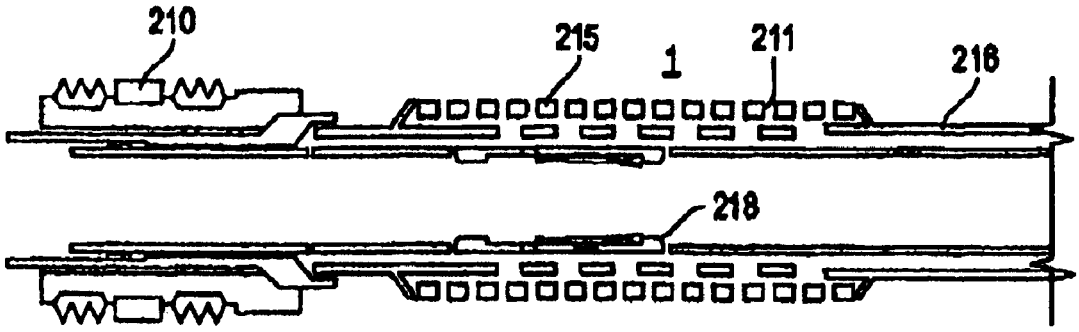
FIGS. 11A through 11D illustrate a cross-sectional side view of a first isolation spring.
Figure 12A:
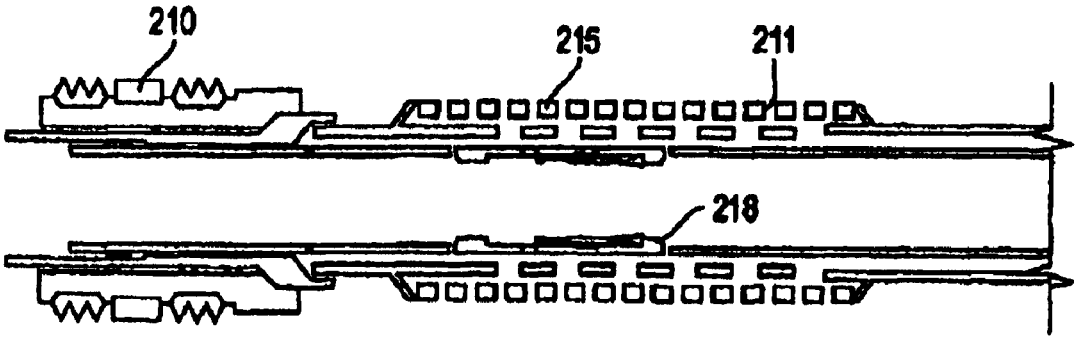
FIGS. 12A through 12I illustrate a cross-sectional side view of a second isolation string stung into the first isolation string shown in FIG. 11.
Figure 11B:
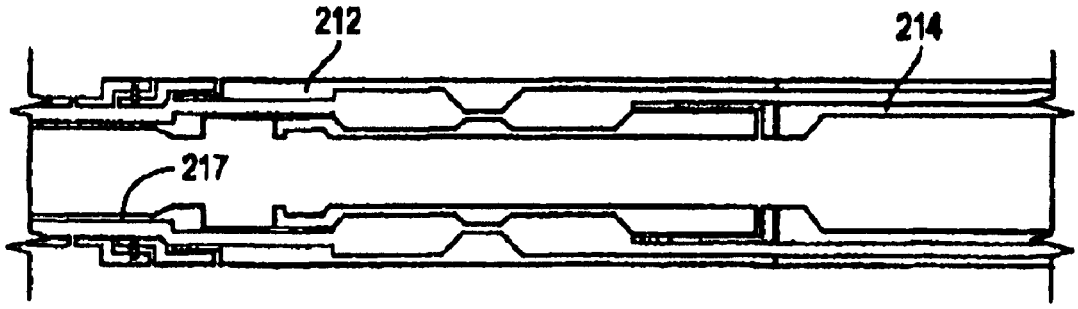
Figure 12B:
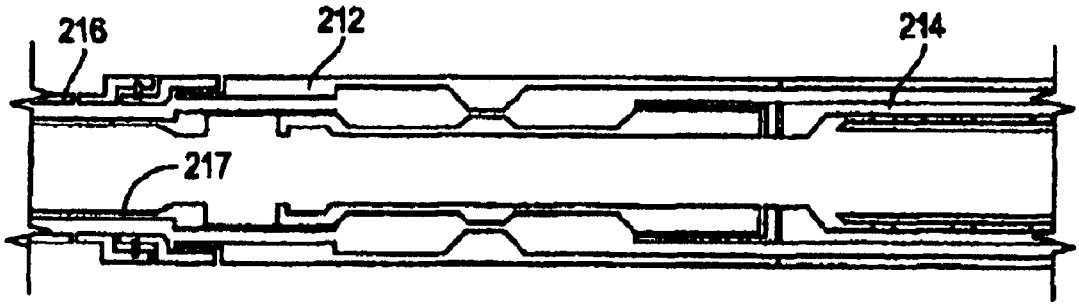
Figure 11C:
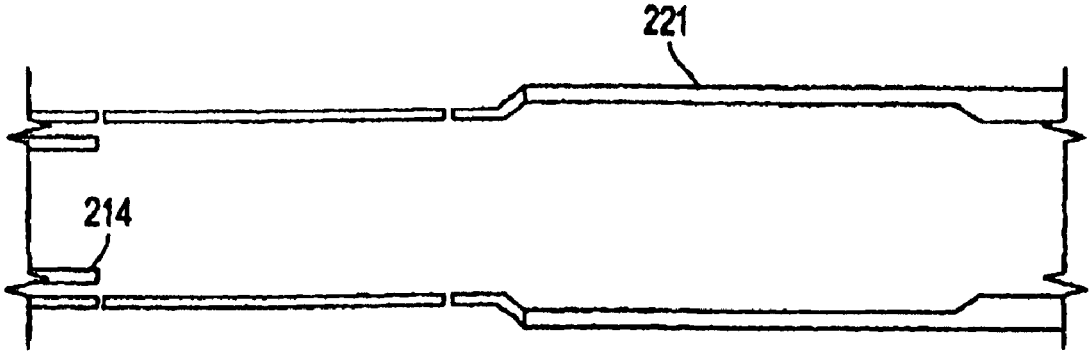
Figure 12C:
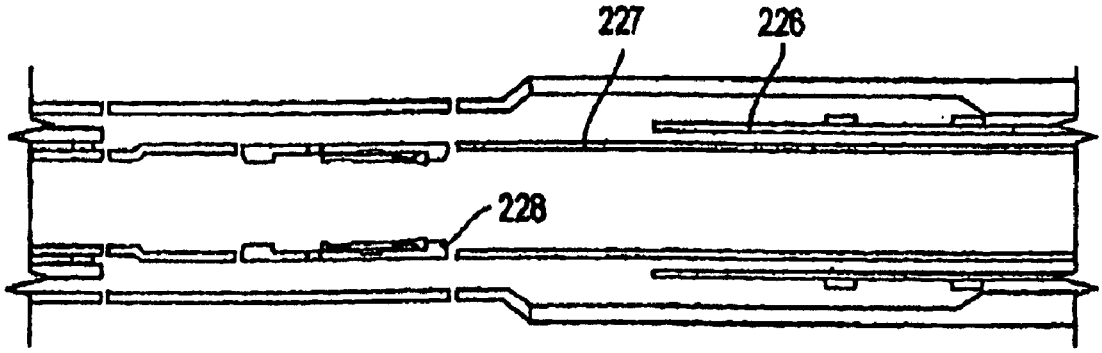
Figure 11D:
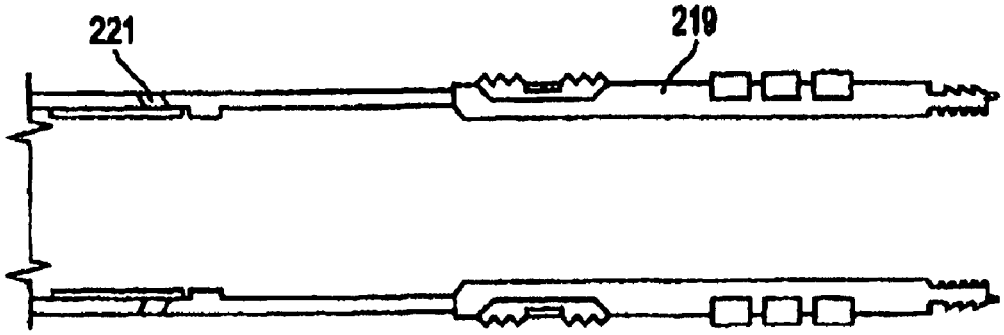
Figure 12D:
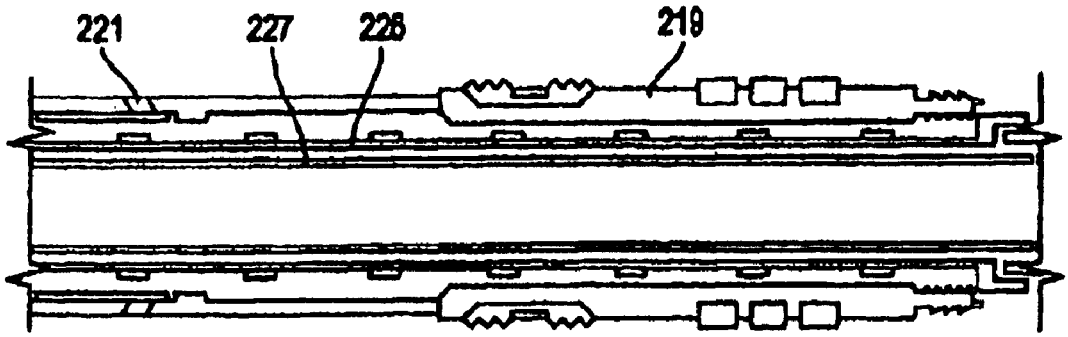
Figure 12E:
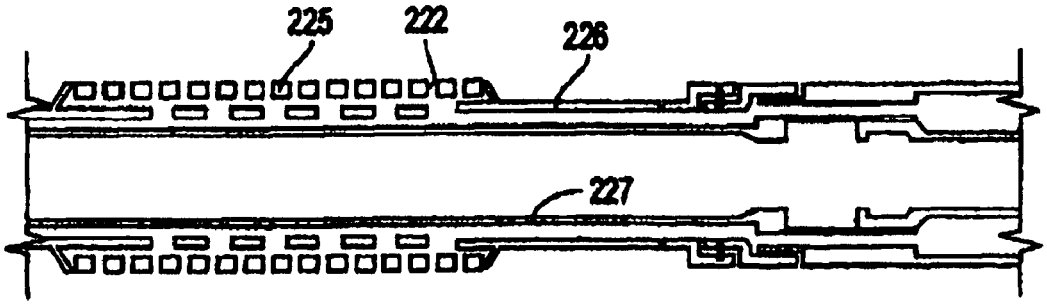
Figure 12F:
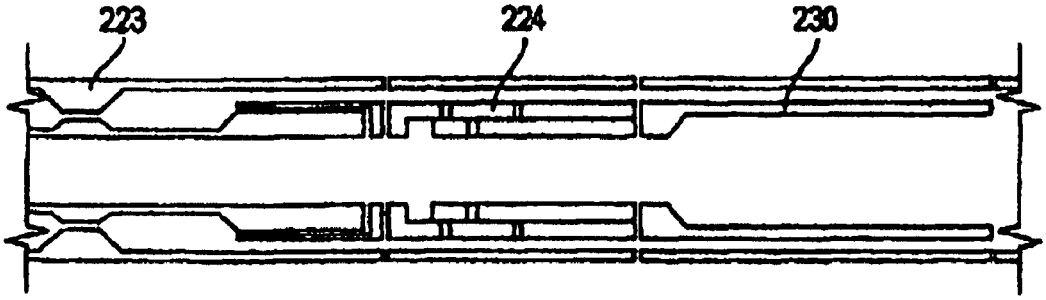
Figure 12G:
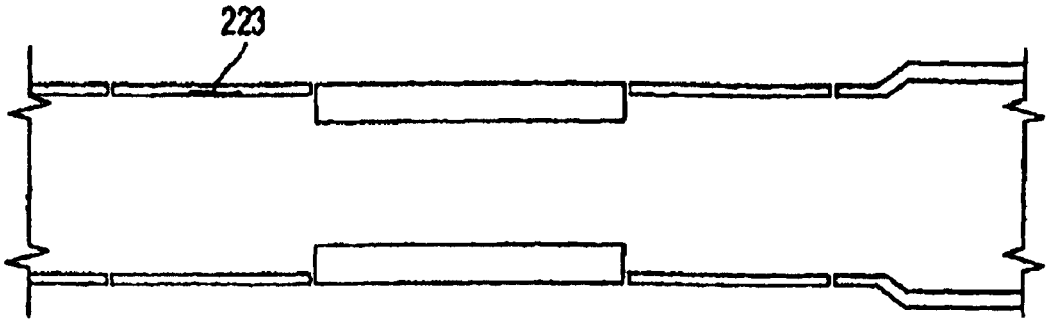
Figure 12H:
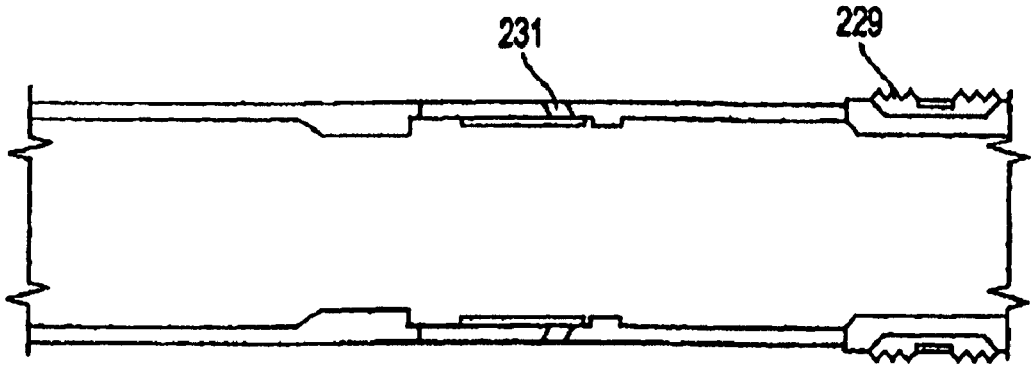
Figure 12I:
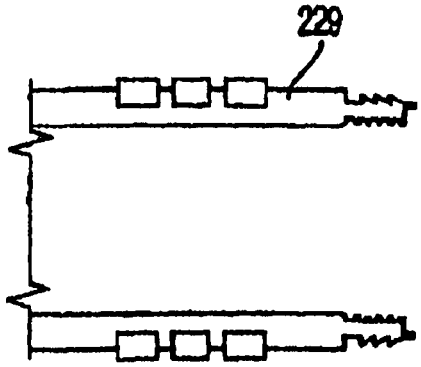
Figure 13A:
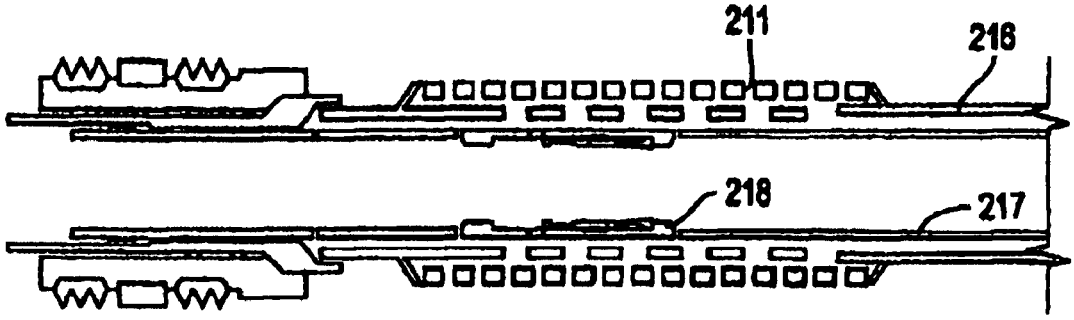
FIGS. 13A through 13L illustrate a cross-sectional side view of a third isolation string stung into the second isolation string shown in FIG. 12, wherein the first isolation string is also shown.
Figure 14A:
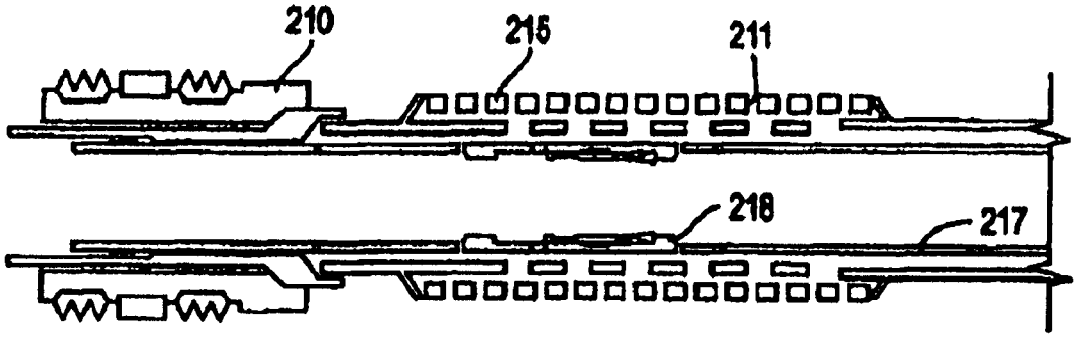
FIGS. 14A through 14L illustrate a cross-sectional side view of the first, second and third isolation strings shown in FIGS. 11 through 13, wherein a production string is stung into the third isolation string.
Figure 13B:
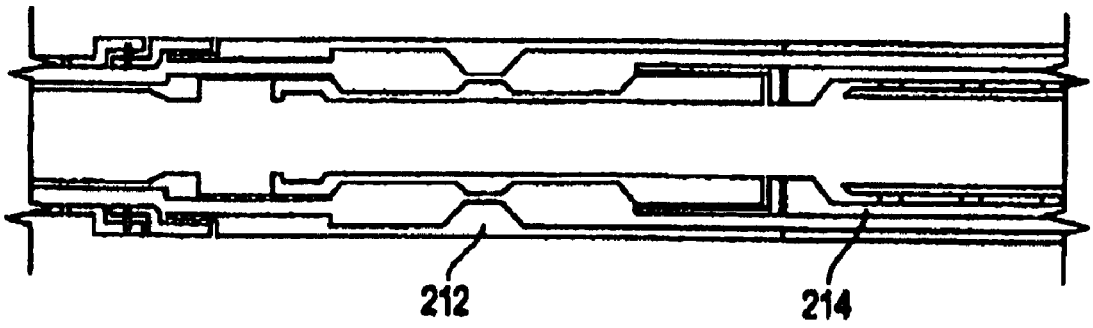
Figure 14B:
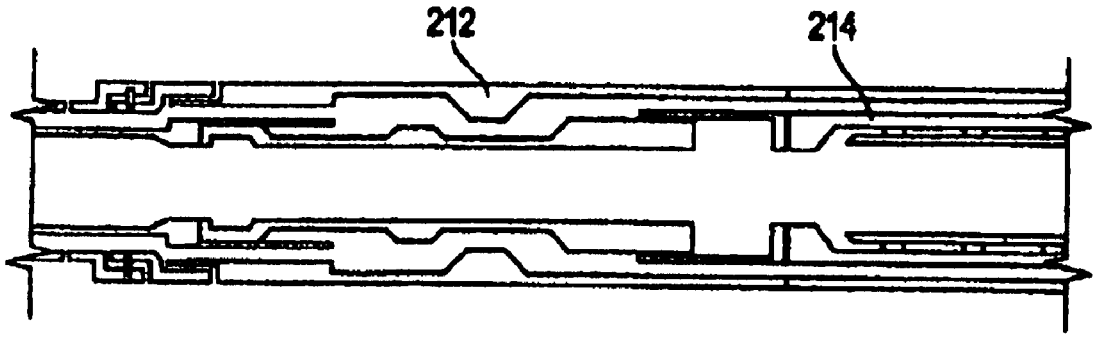
Figure 13C:
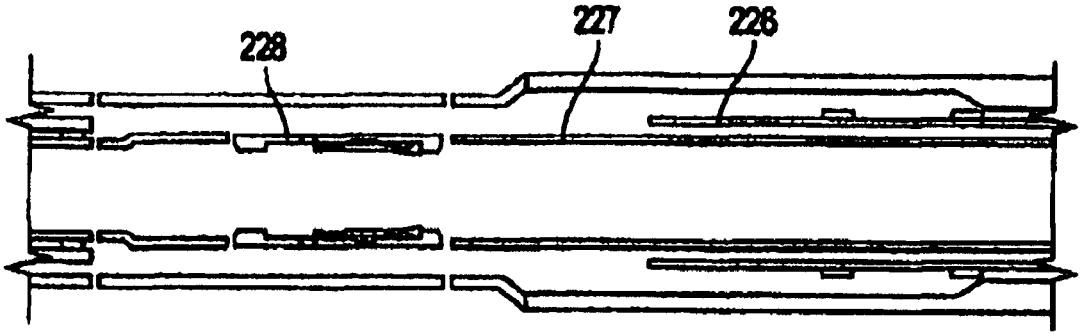
Figure 14C:
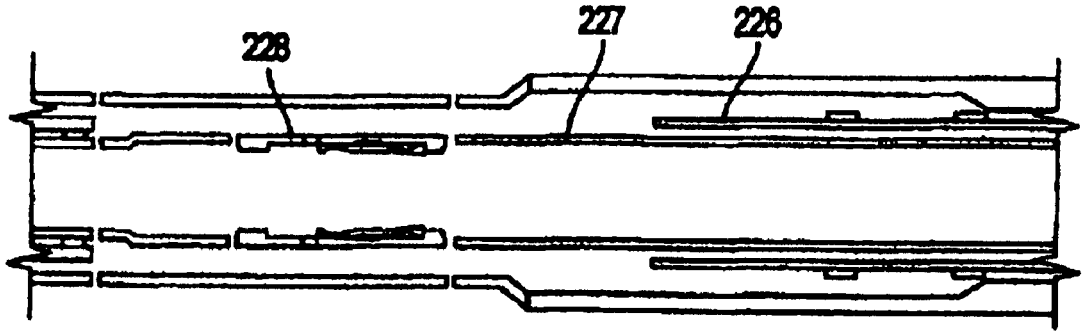
Figure 13D:
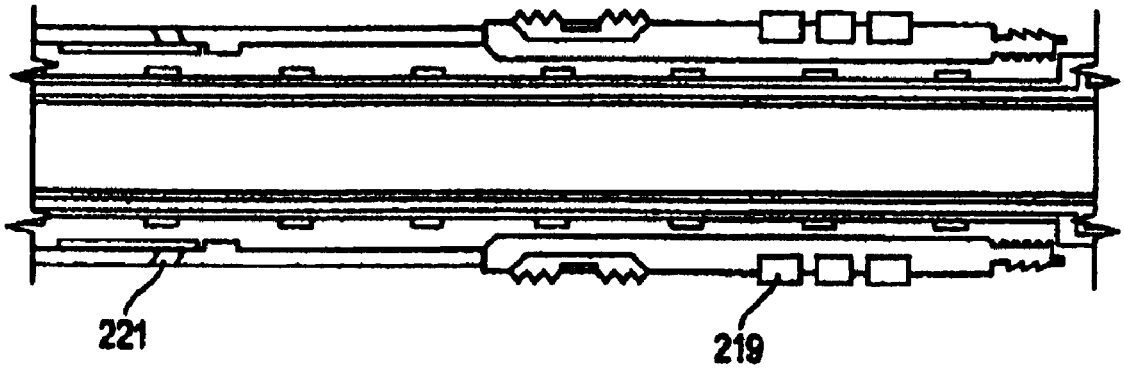
Figure 14D:
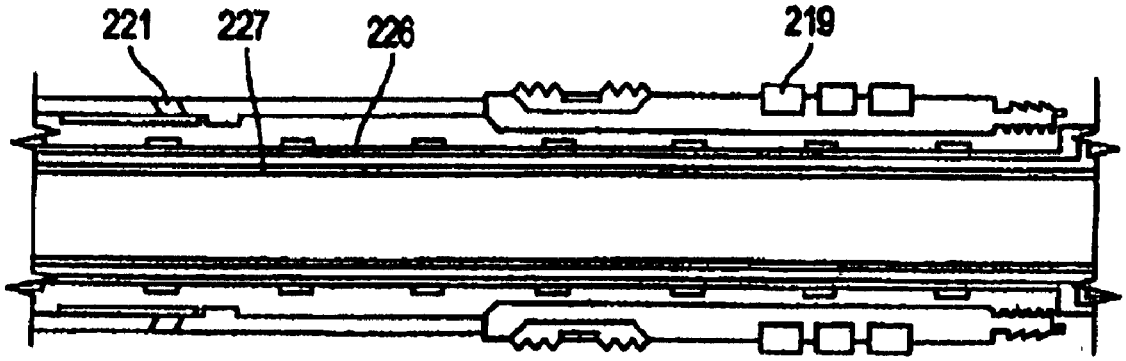
Figure 13E:
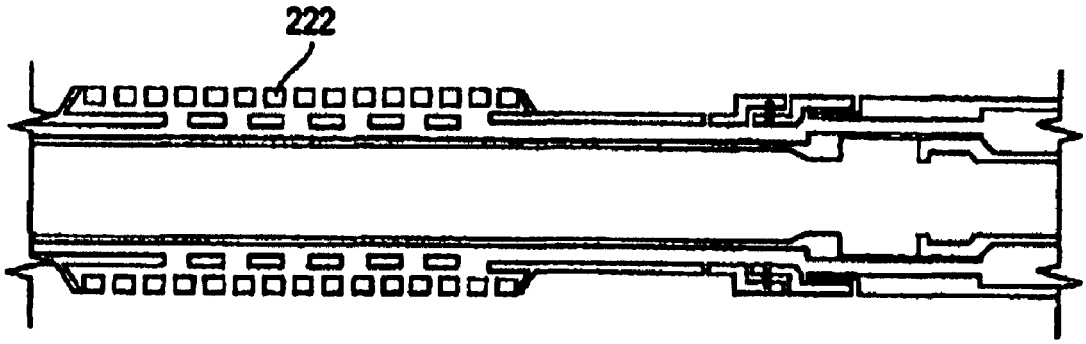
Figure 14E:
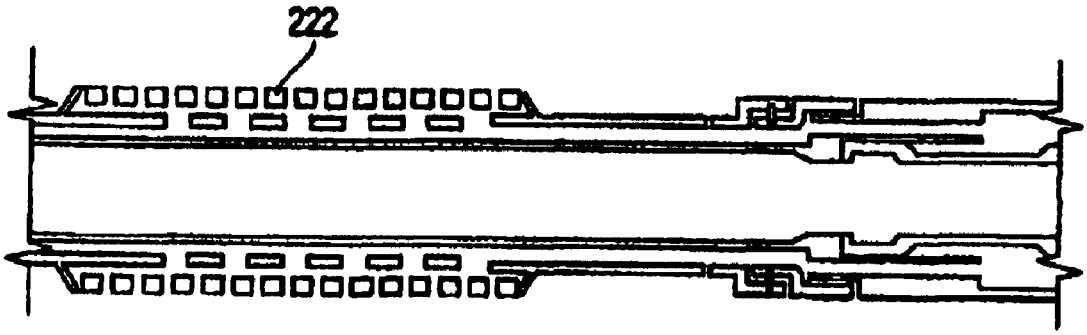
Figure 13F:
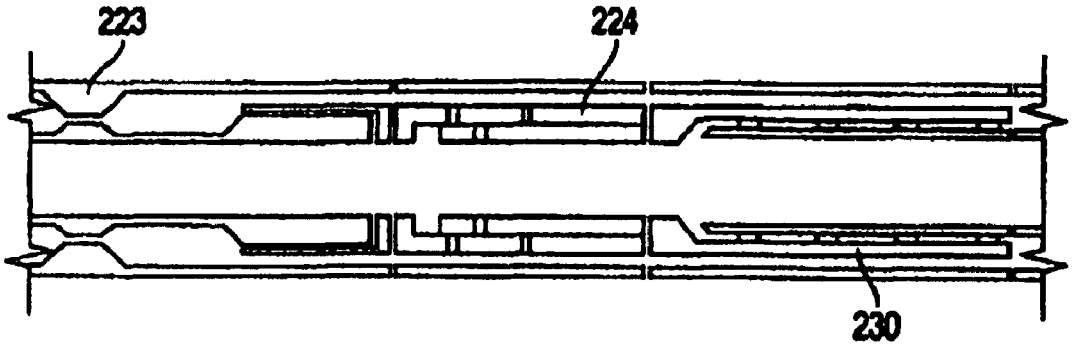
Figure 14F:
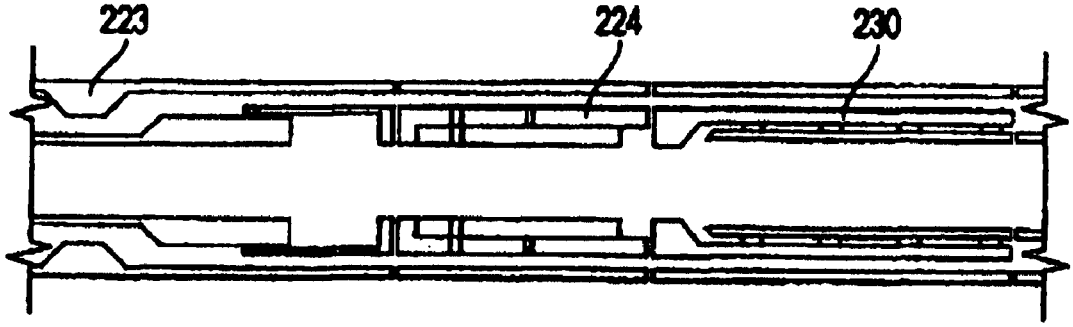
Figure 13G:
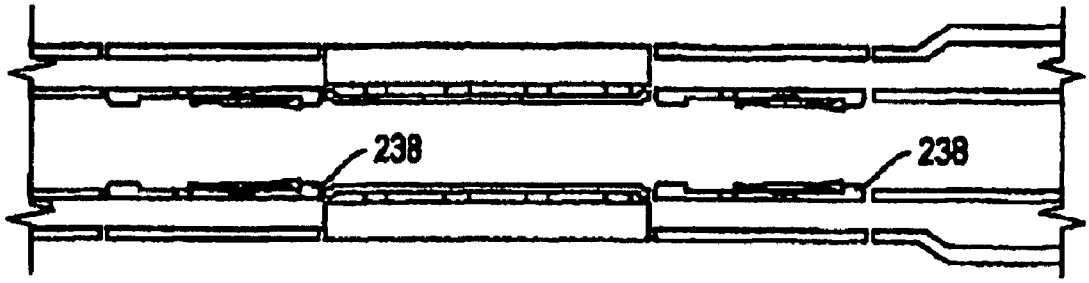
Figure 14G:
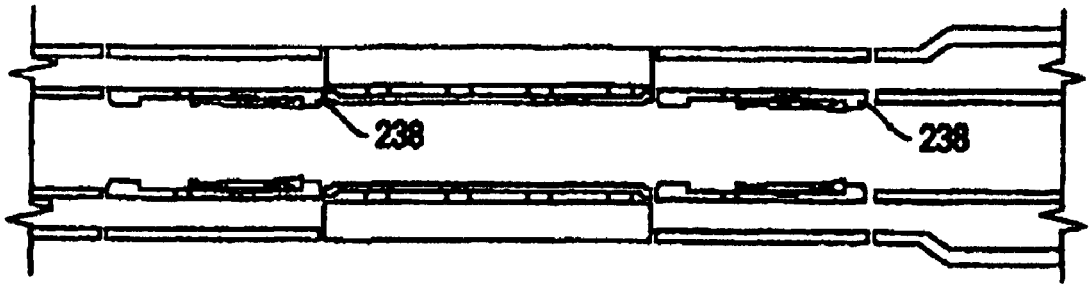
Figure 13H:
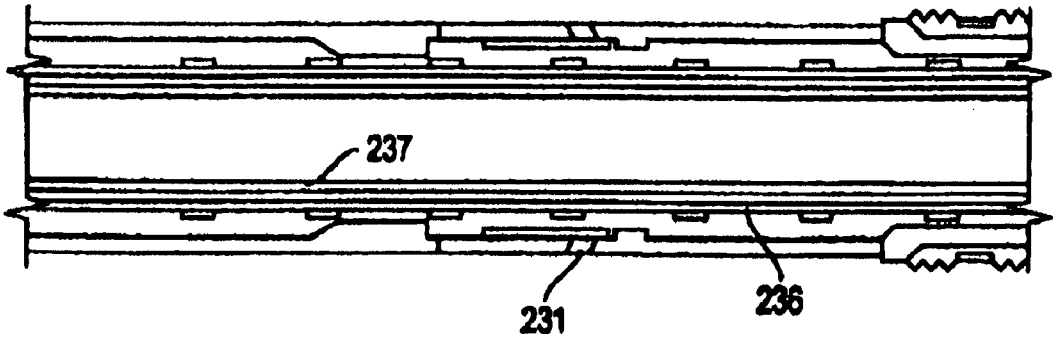
Figure 14H:
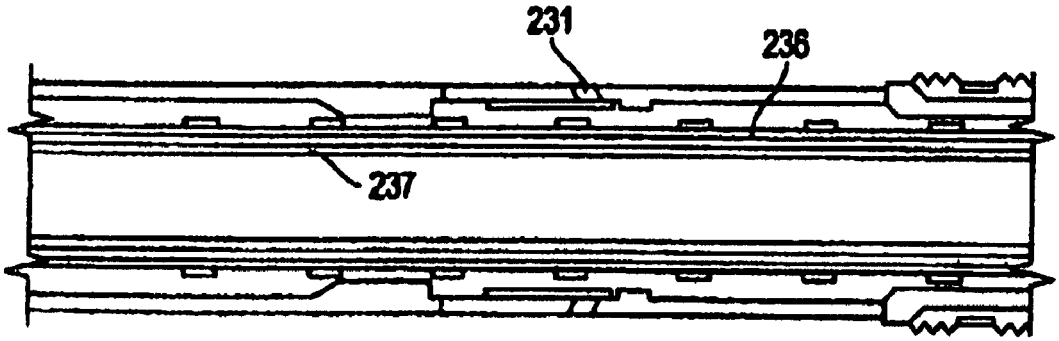
Figure 13I:
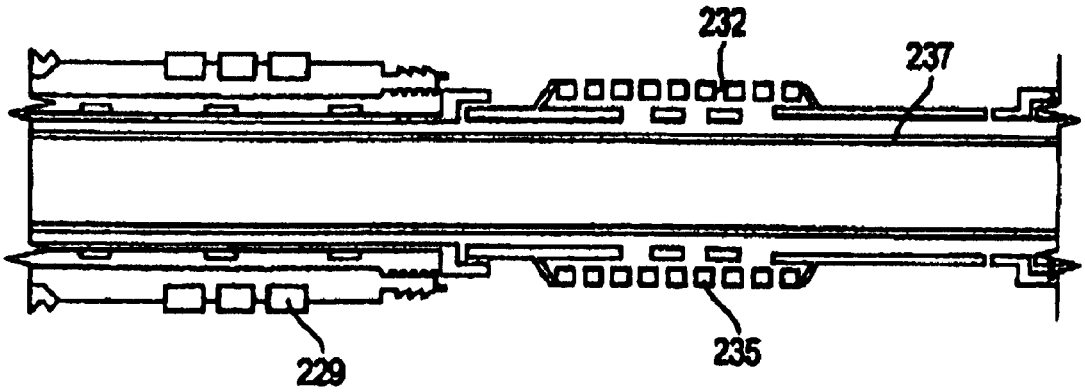
Figure 14I:
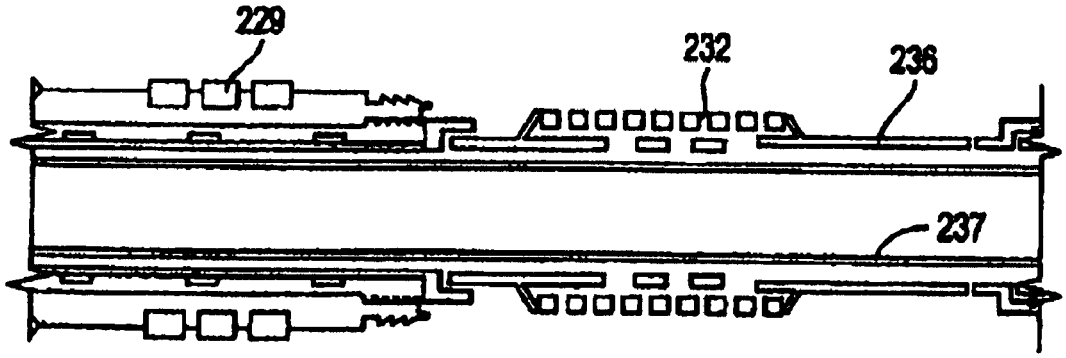
Figure 13J:
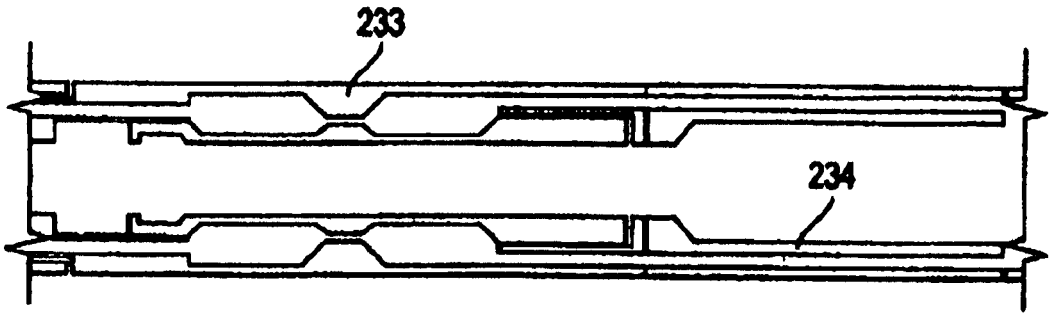
Figure 14J:
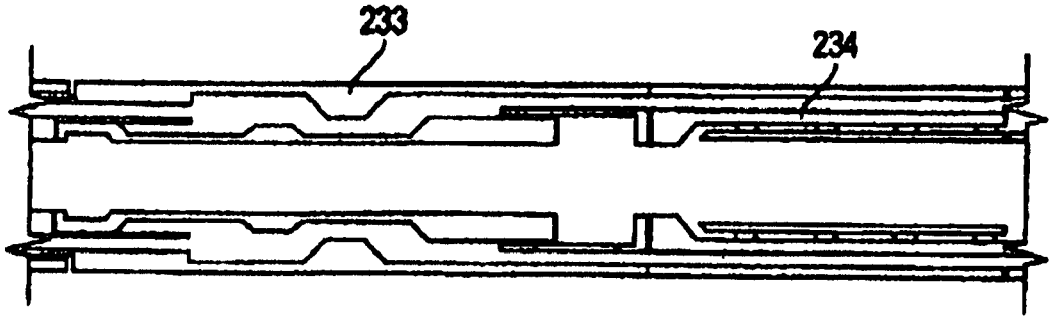
Figure 13K:
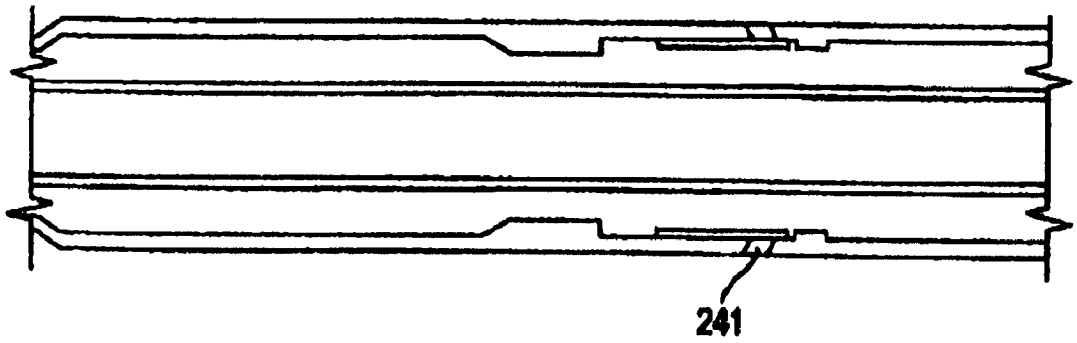
Figure 14K:
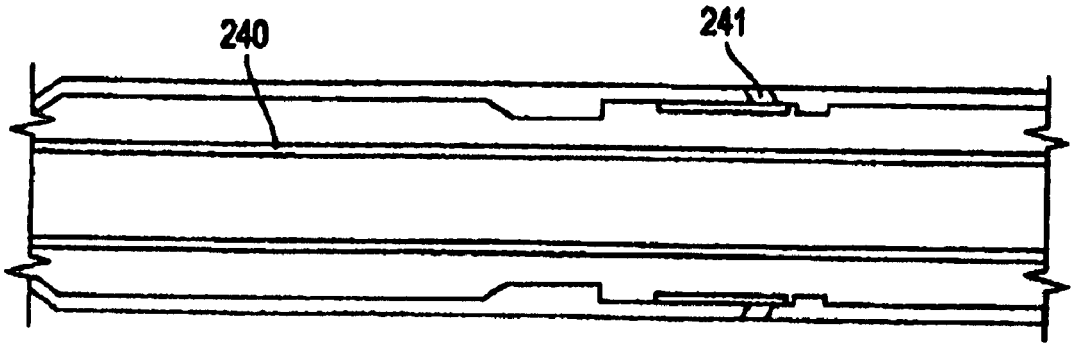
Figure 13L:
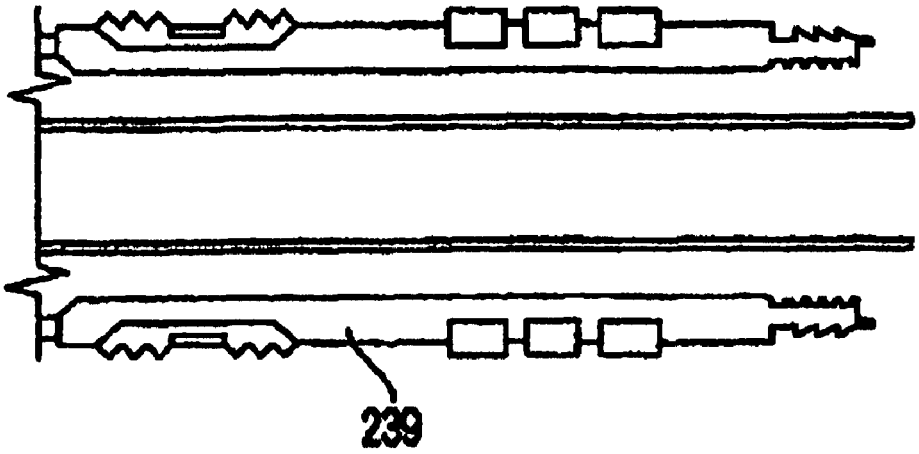
Figure 14L:
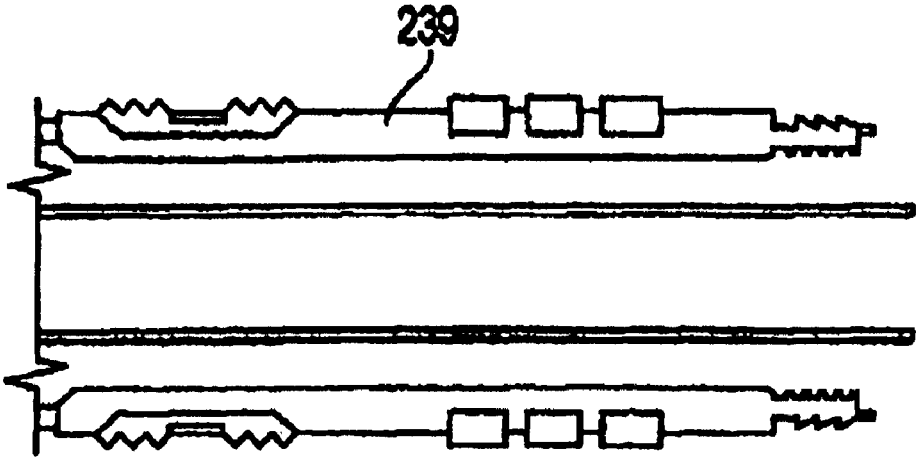

Shown in FIG. 10 is a cross-sectional, diagrammatic view taken along line A—A of FIG. 9C showing the full assembly.

Although only a single preferred PAC valve embodiment of the invention has been shown and described in the foregoing description, numerous variations and uses of a PAC valve according to the present invention are contemplated. As examples of such modification, but without limitation, the valve connections to the production tubing may be reversed such that the inner sleeve moves down hole to the open configuration. In this configuration, use of a spring 180 may not be required as the weight of the inner sleeve may be sufficient to move the valve to the open configuration. Further, the inner sleeve may be connected to the production tubing and the outer sleeve may be slidable disposed about the inner sleeve. A further contemplated modification is the use of an internal mechanism to engage a shifting tool to allow tools to manipulate the valve if necessary. In such a configuration, locking ring 168 may be replaced by a moveable lock that could again lock the valve in the closed configuration. Alternatively, spring 180 may be disengageable to prevent automatic reopening of the valve.

Further, use of a PAC valve according to the present invention is contemplated in many systems. One such system is the ISO system offered by BJ Services Company U.S.A. (successor to OSCA, Inc.) and described in U.S. Pat. No. 5,609,204; the disclosure therein is hereby incorporated by reference. A tool shiftable valve disclosed in the above patent is a type of isolation valve and may be utilized within the production screens to accomplish the gravel packing operation. Such a valve could be closed as the crossover tool string is removed to isolate the formation. The remaining production valves adjacent the production screen may be pressure actuated valves according to the present invention such that inserting a tool string to open the valves is unnecessary.

FIGS. 11 through 14 illustrate several steps in the construction of an isolation and production system according to an embodiment of the present invention.

FIGS. 11A through 11D show a first isolation string 211. The isolation string comprises a PAD valve 212. At the lower end of the isolation string 211, there is a lower packer 210 and at the upper end of the isolation string 211 there is an upper packer 219. A base pipe 216 is connected to the lower packer 210 and has a production screen 215 therearound. The isolation string 211 further comprises an isolation valve 218 on a isolation pipe 217. The PAD valve 212 enables fluid communication through the annulus between the isolation pipe 217 and the isolation string 211. The first isolation string 211 also comprises a sub 214 attached to the top of the PAD valve 212. Further, in the base pipe section between the PAD valve 212 and the upper packer 219, there is a crossover valve 221. This configuration of the first isolation string 211 enables the first production zone 1 to be fractured, gravel packed, and isolated through the first isolation string 211. Upon completion of these procedures, the isolation valve 218 and PAD valve 212 are closed to isolate the production zone 1.

FIGS. 12A through 12I show cross-sectional, side views of two isolation strings. In particular, a second isolation string 222 is stung inside an isolation string 211. Isolation string 222 comprises a PAD valve 223 and a PAC valve 224. The isolation string 211, shown in this figure, is the same as the isolation string shown in FIG. 11. After the gravel/pack and isolation function are performed on the first zone with the isolation string 211, the isolation string 222 is stung into the isolation string 211. The second isolation string 222 comprises a base pipe 226 having a production screen 225 therearound. The base pipe 226 is stung into the packer 219 of the first isolation string 211. The second isolation string 222 also comprises a isolation pipe 227 which is stung into the sub 214 of the first isolation string 211. The isolation pipe 227 also comprises an isolation valve 228. At the tops of the base pipe 226 and isolation pipe 227, there is connected a PAD valve 223. A PAC valve 224 is connected to the top of the PAD valve 223. Also, a sub 230 is attached to the top of the PAC valve 224. An upper packer 229 is also connected to the exterior portion of the PAD valve 223 through a section of base pipe 226 which also comprises a cross-over valve 231.

Referring to FIGS. 13A through 13L, the isolation strings 211 and 222 of FIG. 12 are shown. However, in this figure, a third isolation string 232 is stung into the top of isolation string 222. In this particular configuration, isolation strings 211 and 222 produce fluid from respective zones 1 and 2 up through the annulus between the isolation strings and the isolation sleeves until the fluid reaches the PAC valve 224. The co-mingled production fluid from production zones 1 and 2 pass through the PAC valve 224 into the interior of the production string. The production fluids from zone 3 is produced through the isolation string 232 up through the annulus between the isolation string 232 and the isolation pipe 237. In the embodiment shown in FIG. 13, the PAD valves 212, 223 and 233 are shown in the closed position so that all three of the production zones are isolated. Further, the PAC valve 224 in isolation string 222 is shown in a closed position.

The third isolation string 232 comprises a base pipe 236 which is stung into the packer 229 of the second isolation string. The base pipe 236 also comprises a production screen 235. Inside the base pipe 236, there is a isolation pipe 237 which is stung into the sub 230 of the second isolation string 222. The isolation pipe 237 comprises isolation valve 238. A PAD valve 233 is connected to the tops of the base pipe 236 and isolation pipe 237. A sub 234 is connected to the top of the PAD valve 233. An upper packer 239 is also connected through a section of base pipe 236 to the PAD valve 233. This section of base pipe also comprises a cross-over valve 241.

Referring to FIGS. 14A through 14L, the isolation strings 211, 222 and 232 of FIG. 13 are shown. In addition to these isolation strings, a production tube 240 is stung into the top of isolation string 232. With the production tube 240 stung into the system, pressure differential is used to open PAD valves 212, 223, and 233. In addition, the pressure differential is used to set PAC valve 224 to an open position. The opening of these valves enables co-mingled production from zones 1 and 2 through the interior of the production tube while production from zone 3 is through the annulus on the outside of the production tube 240.

The packers, productions screens, isolations valves, base pipes, isolations pipes, subs, cross-over valves, and seals may be off-the-shelf components as are well known by persons of skill in the art.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system for completing a well, comprising:

a base pipe comprising a hole;

at least one packer in mechanical communication with said base pipe;

at least one screen in mechanical communication with said base pipe, wherein said at least one screen is proximate the hole in said base pipe;

an isolation pipe concentric within said base pipe and proximate to the hole in said base pipe, wherein an annulus is defined between said base pipe and said isolation pipe;

an annular flow valve in mechanical communication with said base pipe and said isolation pipe and adapted to control fluid flow through said annulus above and below said valve; and a tool shiftable valve coupled to the isolation pipe.

2. The system of claim 1, wherein the annular flow valve is a pressure activated valve.

3. The system of claim 1, further comprising an additional valve coupled to the isolation string, the additional valve comprising a pressure activated valve.

4. The system of claim 1, further comprising a crossover valve in mechanical communication with the base pipe.

5. The system of claim 1, wherein the tool shiftable valve comprises a sliding sleeve shiftable between an open position and a closed position.

6. The system of claim 5, wherein the system is adapted to be inserted into a well to allow a gravel pack operation to occur prior to a closure of the sleeve to allow operation of the annular flow valve through pressurized fluid.

7. An isolation system, comprising:

an isolation pipe comprising a pressure activated valve establishing a first flow path and coupled to the isolation pipe, and a tool shiftable valve establishing a second flow path and coupled to the isolation pipe and in communication with the pressure activated valve and being shiftable by a tool between an opened and closed flow condition.

8. The system of claim 7, wherein the tool shiftable valve is inserted into a well to allow a gravel pack operation to occur prior to closing the tool shiftable valve to allow operation of the pressure activated valve through pressurized fluid.

9. The system of claim 7, wherein the isolation pipe defines at least one port, and wherein the open position of the tool shiftable valve allows fluid flow through the port.

10. The system of claim 7, further comprising:

a base pipe;

the isolation pipe being disposed within the base pipe, defining a volume between the base pipe and the isolation pipe;

the pressure activated valve comprising a valve adapted to allow flow between the volume formed by the isolation pipe and the base pipe and an internal portion of the isolation pipe.

11. The system of claim 7, wherein said pressure activated valve comprises:

an outer sleeve having at least one opening and an inner sleeve, the sleeves being movable relative to each other and configurable in at least locked-closed, unlocked-closed, and open configurations, wherein the inner sleeve covers the at least one opening in the locked-closed and unlocked-closed configurations and the inner sleeve does not cover the at least one opening in the open configuration; and a pressure area on at least one of the sleeves, wherein pressure acting on the pressure area configures the outer sleeve and inner sleeve between the locked-closed and unlocked-closed configurations.

12. The system of claim 11, further comprising a lock between the inner sleeve and the outer sleeve that locks the inner sleeve and the outer sleeve in the locked-closed configuration.

13. The system of claim 11, further comprising a spring member adapted to bias the inner sleeve relative to the outer sleeve so that the inner sleeve does not cover the at least one opening of the outer sleeve in the open configuration when the lock is released.

14. The system of claim 11, wherein the inner sleeve comprises at least one opening that is selectably aligned with the at least one opening in the outer sleeve to allow fluid flow therethrough.

15. The system of claim 14, further comprising a production screen, wherein fluid passing through the production screen is communicable with the pressure activated valve and the tool shiftable valve.

16. The system of claim 15, wherein the production screen is wrapped around the outside of the pressure activated valve and the tool shiftable valve.

17. A method for isolating a production zone of a well, comprising:

inserting a pipe into the well, the pipe comprising a pressure activated valve and a tool shiftable valve;

shifting the tool shiftable valve with a tool to a closed flow condition while the tool shiftable valve is disposed in the well; then opening the pressure activated valve by pressurized fluid acting on the pressure activated valve.

18. The method of claim 17, wherein opening the pressure activated valve occurs while the tool shiftable valve remains in the well.

19. The method of claim 17, further comprising performing a gravel pack operation on the well while the tool shiftable valve is open and the pressure activated valve is closed.

20. The method of claim 17, wherein the pipe comprises an isolation string.

21. The method of claim 17, further comprising allowing production fluid to flow through the pressure activated valve, the tool shiftable valve, or a combination thereof.

22. The method of claim 17, wherein shifting the tool shiftable valve comprises using a shifting tool to actuate the tool shiftable valve.

23. The method of claim 17, wherein the pressure activated valve comprises an inner sleeve and an outer sleeve having at least one opening, the sleeves being movable relative to each other in at least two directions and initially secured relative to each other in at least one direction, wherein the opening of the pressure activated valve comprises:

applying a pressurized fluid to a pressure area on at least one of the sleeves to cause the sleeves to move relative to each other in a first direction;

reducing pressure to allow the sleeves to move relative to each other in a second direction;

at least partially uncovering the at least one opening to allow fluid flow therethrough.

24. The method of claim 23, further comprising biasing the sleeves relative to each other with a spring member and allowing the sleeves to move relative to each other in the second direction with the spring member after reducing the pressure.

25. A method for isolating a production zone of a well having a perforated casing, comprising:

running-in an isolation string into the well, the isolation string comprising a pressure activated valve and a tool shiftable valve;

setting the isolation string in the casing adjacent the perforations in the casing;

shifting the tool shiftable valve with a shifting tool to a no flow condition;

stinging a production string into the isolation string; and thereafter opening the pressure activated valve.

26. The method of claim 25, wherein the tool shiftable valve is closed during the opening of the pressure activated valve.

27. The method of claim 25, further comprising performing a gravel pack operation on the well while the tool shiftable valve is open and the pressure activated valve is closed.

28. The method of claim 25, further comprising withdrawing the shifting tool from the well after shifting the tool shiftable valve.

29. The method of claim 25, wherein the isolation string further comprises an annular flow valve, and further comprising opening the annular flow valve and allowing fluid flow into the annular flow valve.

30. The method of claim 29, further comprising allowing fluid flow through the annular flow valve while allowing fluid flow through the pressure activated valve into an internal portion of the isolation pipe.

31. The method of claim 29, further comprising opening the annular flow valve with a pressurized fluid, actuating the pressure activated valve to an unlocked closed position with the pressurized fluid, reducing the pressure of the pressurized fluid to open the pressure activated valve, and allowing fluid flow through the annular flow valve and the pressure activated valve.

32. The method of claim 29, wherein fluid flow through the annular flow valve comprises a fluid from a first zone and the fluid flow through the pressure activated valve comprises a fluid from another zone.

33. The method of claim 32, wherein the pressure activated valve is in fluidic contact with a second annular flow valve and the fluid flow through the pressure activated valve and second annular flow valve comprises the same fluid.

34. An isolation system for an oil or gas well, comprising:

an isolation pipe;

a screen assembly adjacent a well formation;

a tool shiftable valve coupled to the isolation pipe for selectively communicating fluid to and/or from the screen assembly; and a pressure activated valve coupled to the isolation pipe for selectively communicating fluid to and/or from the screen assembly.

35. The isolation system of claim 34, wherein the pressure activated valve comprises a slidable sleeve and the tool shiftable valve is shifted by a removable tool conveyed along an interior of the isolation pipe.

36. The isolation system of claim 35, wherein the pressure activated valve and the tool shiftable valve are arranged to control fluid in parallel.

37. The isolation system of claim 36, wherein the pressure activated valve is actuated by fluid pressure selected from the group consisting of isolation pipe pressure, annulus pressure uphole from a packer, annulus pressure adjacent a formation, and any combination thereof.

38. The isolation system of claim 37, wherein the pressure activated valve is selected from the group consisting of: a valve for controlling flow through an annular space in the isolation system, a valve for controlling flow from or to an exterior of the isolation system, and any combination thereof.

39. An isolation system, comprising:

a base pipe;

an isolation pipe disposed within the base pipe;

a volume defined between the base pipe and the isolation pipe;

a pressure activated valve coupled to the isolation pipe and comprising a valve adapted to allow flow between the volume and an internal portion of the isolation pipe; and a tool shiftable valve coupled to the isolation pipe.

40. The isolation system of claim 39, wherein the pressure activated valve comprises a slidable sleeve and the tool shiftable valve is shifted by a removable tool conveyed along an interior of the isolation pipe.

41. The isolation system of claim 40, further comprising a wherein the pressure activated valve and the tool shiftable valve are arranged to control fluid in parallel.

42. The isolation system of claim 41, further comprising a screen assembly externally adjacent the pressure activated valve and the tool shiftable valve.

43. A method for isolating a production zone of a well, comprising:

inserting a pipe into the well comprising a pressure activated valve having a movable sleeve, and a tool shiftable valve;

shifting the tool shiftable valve closed with a tool while the tool shiftable valve is disposed in the well;

thereafter opening the pressure activated valve by applying a pressurized fluid to a pressure area on the sleeve to cause the sleeve to move.

44. A method for producing from a well having a perforated casing, comprising:

running-in the well a production assembly comprising a pressure activated valve, an isolation string, a production screen and a tool shiftable valve;

setting the production assembly in the casing adjacent the perforations;

shifting the tool shiftable valve with a shifting tool;

stinging a production string into the production assembly; and applying pressure to the pressure activated valve to open it.

45. An isolation system, comprising:

an isolation pipe extending below a packer assembly comprising a pressure activated valve establishing a first flow path and coupled to the isolation pipe, and a mechanically activated valve establishing a second flow path and coupled to the isolation pipe and in communication with the pressure activated valve and being mechanically actuatable by a tool between opened and closed flow conditions.

46. A method for isolating a production zone of a well, comprising:

inserting a pipe into the well comprising a pressure activated valve and a separate mechanically activated valve;

shifting the mechanically activated valve with a tool to prevent flow there through while the mechanically activating valve is disposed in the well; then opening the pressure activated valve by pressurized fluid acting on the pressure activated valve.

* * * * *

UNITED STATES PATENT AND TRADEMARK OFFICE

CERTIFICATE OF CORRECTION

PATENT NO. : RE 40,648 E
APPLICATION NO. : 11/711591
DATED : March 10, 2009
INVENTOR(S) : Turner et al.

It is certified that error appears in the above-identified patent and that said Letters Patent is hereby corrected as shown below:

In the Claims – should read –

Col. 16 line 48-52
37. The isolation system of claim 36, wherein the pressure activated valve is actuated by fluid pressure selected from the group consisting of: isolation pipe pressure, annulus pressure uphole from a packer, annulus pressure adjacent a formation, and any combination thereof.

Col. 18 line 17
46. A method for isolating a production zone of a well, comprising: inserting a pipe into the well comprising a pressure activated valve and a separate mechanically activated valve; shifting the mechanically activated valve with a tool to prevent flow there through while the mechanically activated valve is disposed in the well; then opening the pressure activated valve by pressurized fluid acting on the pressure activated valve.

Signed and Sealed this

Fifth Day of May, 2009

John Doll

JOHN DOLL
*Acting Director of the United States Patent and Trademark Office*